(12) United States Patent
Schoen et al.

(10) Patent No.: US 7,895,241 B2
(45) Date of Patent: Feb. 22, 2011

(54) METHOD AND APPARATUS FOR OILFIELD DATA REPOSITORY

(75) Inventors: Eric Jonathan Schoen, Bellaire, TX (US); Joseph A. Wald, Houston, TX (US); Richard George Esau, Oxford (GB); Truls Arnegaard, Oslo (NO); Stephen Whitley, Katy, TX (US); Herman Veldhuizen, Kolsaas (NO); Hallgrim Ludvigsen, Stavanger (NO); Andrew John Round, Abingdon (GB)

(73) Assignee: Schlumberger Technology Corp., Houston, TX (US)

( * ) Notice: Subject to any disclaimer, the term of this patent is extended or adjusted under 35 U.S.C. 154(b) by 384 days.

(21) Appl. No.: 11/873,366

(22) Filed: Oct. 16, 2007

(65) Prior Publication Data
US 2008/0235280 A1 Sep. 25, 2008

Related U.S. Application Data

(60) Provisional application No. 60/852,175, filed on Oct. 16, 2006.

(51) Int. Cl.
*G06F 17/30* (2006.01)
(52) U.S. Cl. .................. 707/802; 707/803; 707/809
(58) Field of Classification Search .............. 707/104.1, 707/809, 810, 812, 802
See application file for complete search history.

(56) References Cited

U.S. PATENT DOCUMENTS

| 5,694,598 A * | 12/1997 | Durand et al. .......... 707/103 R |
| 5,765,159 A | 6/1998 | Srinivasan |
| 5,829,006 A | 10/1998 | Parvathaneny et al. |
| 7,363,578 B2 * | 4/2008 | Bendsen et al. ............. 715/236 |
| 2003/0149934 A1 * | 8/2003 | Worden ...................... 715/513 |

FOREIGN PATENT DOCUMENTS

| EP | 1383056 A2 | 1/2004 |
| EP | 1385100 A2 | 1/2004 |
| EP | 1696348 A2 | 8/2006 |
| WO | 99/32996 | 7/1999 |
| WO | WO 2007022289 A2 * | 2/2007 |

* cited by examiner

*Primary Examiner*—Mohammad Ali
*Assistant Examiner*—Thuy (Tiffany) Bui
(74) *Attorney, Agent, or Firm*—Robert P. Lord; Jim Patterson; Bryan P. Galloway

(57) ABSTRACT

The invention relates to a method for performing operations of an oilfield having at least one wellsite, a surface network, and a process facility, each wellsite having a wellbore penetrating a subterranean formation for extracting fluid from an underground reservoir therein. The method includes storing oilfield data associated with a plurality of oilfield entities in a first data repository, obtaining a first target metamodel comprising structural description of a first plurality of data entities of the first data repository, obtaining a domain metamodel interleaved with a first mapping specification, the domain metamodel comprising structural description of a domain model for representing the plurality of oilfield entities in an application programming interface, obtaining a mapping specification associating the first target metamodel with the domain metamodel and forming the application programming interface based on the domain metamodel, the first target metamodel, and the first mapping specification using a computer implemented method.

18 Claims, 27 Drawing Sheets

```
621 → <DOG_Object Object="BoiBorehole" Parent="BoiEntity"
              Namespace="Slb.Drilling.Reference">
622 →   <Map_Object Mapping="Seabed" Entity="Borehole">
                                 ↙617                    ↙618
623 →     <Map_Part Part="BBAI" Entity="Borehole_BA_Involvement">
                              ↙619                  ↙620
624 →       <Map_Defn Attr='Involvement_Role="Project_Team"' />
          </Map_Part>
          <Map_Part Part="Borehole_Status" >
            <Map_Defn Attr="End_Date" Old="New[Start_Date]" />
            <Map_Defn Attr="Start_Date" Value="DateTime.Now"
                      Default_Flag="true" />
          </Map_Part>
        </Map_Object>
                                 ↙614
625 →   <DOG_Attr Property="UWI">
                                         ↙615
          <Map_Attr Mapping="Seabed" Attr="UBHI"/>
        </DOG_Attr>
626 →   <DOG_Link Property="BoreholeActivities"
                  Object="BoiBoreholeActivity" Many="Set">
        <DOG_Link Property="BusinessAssociateList"
                  Object="BoiBusinessAssociate" Many="Set">
          <Map_Link Mapping="Seabed" Source_Part="BBAI"/>
        </DOG_Link>
        <DOG_Link Property="PlanSurvey" Object="BoiSurvey">
          <Map_Link Mapping="Seabed" >
            <Map_Defn Attr="Existence_Kind" String="Planned" />
            <Map_Defn Attr="Survey_Mode" String="Planned" />
          </Map_Link>
        </DOG_Link>
      </DOG_Object>

<DOG_Object Object="BoiBoreholeActivity" Parent="BoiActivity"
                  Namespace="Slb.Drilling.Reference" >
        <Map_Object Mapping="Seabed" Entity="Generic_Borehole_Activity" >
          <Map_Defn Attr="Super_Activity IS NULL" />
        </Map_Object>
      </DOG_Object>

<DOG_Object Object="BoiSurvey" Parent="BoiEntity"
                  Namespace="Slb.Drilling.Survey" >
627 →   <Map_Object Mapping="Seabed" Entity="Deviation_Survey" >
628 →     <Map_Part Part="Vertical_Section" />
629 →     <Map_Part Part="Coordinate_System" >
            <Map_Part Part="Azimuth_Reference" />
          </Map_Part>
        </Map_Object>
      </DOG_Object>

<DOG_Object Object="BoiBusinessAssociate" Parent="BoiEntity"
                  Namespace="Slb.Drilling.Business" >
        <Map_Object Mapping="Seabed" Entity="Business_Associate" />
      </DOG_Object>
```

Domain-Level Query

Compile-time safe query using domain vocabulary:

```
BoiActualOperationDataPointAccessor aodpAccessor =
BoiActualOperationDataPointAccessor.GetFacadeAccessor(doh)
;

BoiActualOperationDataPointAccessor.QueryCriteria qc =
    new
BoiActualOperationDataPointAccessor.QueryCriteria();

qc.RigState = "Test";
ICollection<BoiActualOperationDataPoint> aodps =
    aodpAccessor.Query(puffin.DataSource, qc);
```

FIG. 22b

Domain-Level Query

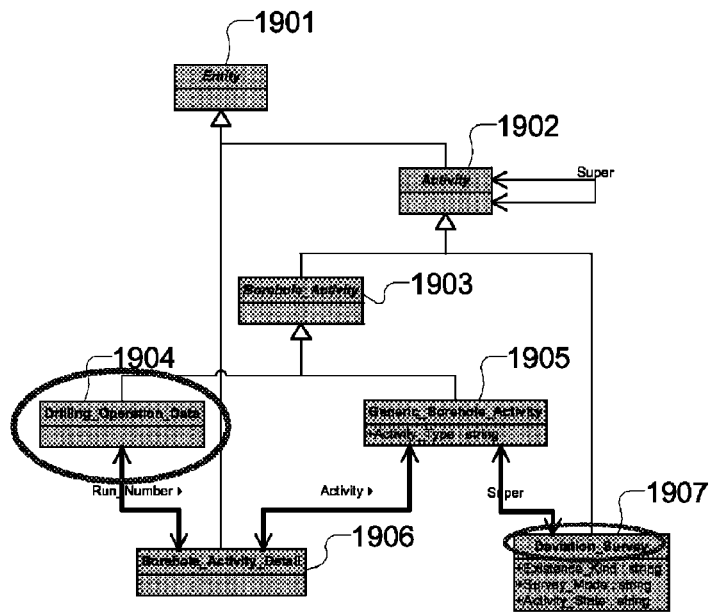

FIG. 22c

Domain-Level Query

```
SELECT DISTINCT Root.Id
FROM
   Deviation_Survey Deviation_Survey,
   Generic_Borehole_Activity Generic_Borehole_Activity,
   Deviation_Survey_REF Deviation_Survey_REF1,
   Borehole_Activity_Detail Borehole_Activity_Detail,
   Drilling_Operation_Data Root
WHERE
(Deviation_Survey.Activity_State = @p0)
AND
(Deviation_Survey.Survey_Mode = @p1)
AND
(((Deviation_Survey_REF1.Property_Code = @p2)
   AND
   ((Deviation_Survey_REF1.Property_Id = Generic_Borehole_Activity.Id)
    AND
    (Deviation_Survey_REF1.Entity_Id = Deviation_Survey.Id)))
AND
 ((Borehole_Activity_Detail.Activity_Id = Generic_Borehole_Activity.Id)
  AND
```

FIG. 22d

Property Priming

Preload domain-level properties for a collection of objects.

```
BoiBoreholeAccessor bba =
    BoiBoreholeAccessor.GetFacadeAccessor(DOH);

boreholes = bba.GetAll(dataSource);
bba.PrimeProperties(boreholes, "TopDepth", "UWI");
```

FIG. 22e

Property Priming

```
SELECT
   Root.Id,
   Well.Id,Well.Address_Id,Well.Drill_Slot_Id,Well.Field_Id,
   Well.Permanent_Coord_System_Id,Well.Surface_Location_Id,
   Well.Id,
   Pos.Id,Pos.Coordinate_System_Id,Pos.Original_Coord_System_Id,
   Pos.Survey_Equipment_Id,Pos.Id,Pos.Elevation,
   Root.UBHI,Root.Id
FROM
   Borehole Root LEFT OUTER JOIN Well Well
   LEFT OUTER JOIN Position Pos
ON Well.Surface_Location_Id = Pos.Id
ON Root.Well_Id = Well.Id
WHERE
Root.Id IN
   (167155,167168,167181,167193,167200,167213,167226,167239,167253,
    167266,167279,167292,167306,167319,167330,167343,167347)
```

FIG. 22f

Generated Code Structure

```
get {
    if ((null == m_PlanSurvey)) {
        // To map from Seabed to BOI...
        // BOI expects cardinality One, but Seabed implements cardinality Many.
        BoiSurveyImpl tmpPlanSurvey = null;
        IList<BoiSurveyImpl> tmpPlanSurveyCollection
            QueryEntities<BoiSurveyImpl>("Deviation_Survey",
                                         "Borehole_Id", GetRootPart,
                                         "Existence_Kind", "Planned"
                                         "Survey_Mode", "Planned");
        if ((tmpPlanSurveyCollection.Count == 1)) {
            tmpPlanSurvey = tmpPlanSurveyCollection[0];
        }
        if ((tmpPlanSurveyCollection.Count > 1)) {
            ThrowDataStoreCardinalityError("PlanSurvey", 1,
tmpPlanSurveyCollection);
        }
        }
        m_PlanSurvey = tmpPlanSurvey;
    }
    return m_PlanSurvey;
```

Callouts: Comments in context; Object Cache; Constraints from mapping; Cardinality mapping; Data Invariants

FIG. 22g

Generated Code Structure

```
public IList<IBoiIndexedDataSource> LogChannels {
    get {
        if ((null == m_LogChannels)) {
            // SELECT Log_Channel_Set2.Id, Log_Channel1.Code,
            // Log_Channel1.Log_Channel_Set_Id, Log_Channel1.Property
            // Log_Channel1.Id
            // FROM Log_Channel Log_Channel1 INNER JOIN Log
            // ON Log_Channel1.Log_Channel_Set_Id = Log_Channel_Set2.Id WHERE
            // Log_Channel1.Log_Channel_Set_Id = p0 ;
            ISelectQuery query = SelectQuery00010(PuffinDataSource.StarfishMetaModel,
                                                  StarfishQueryFactory);
            m_LogChannels =
            QueryEntities<IBoiIndexedDataSource>(
                ((ISimpleTableReference)(((IJoinedTableReference)
                                          (query.TableReference)).Right)),
                query,
                    StarfishQueryFactory.CreateValueOperand(
                    StarfishQueryFactory.CreateDataValue(
                    ((int)(GetRootPart(EntityCreateOption.Never).Get("Id
            m_LogChannels.ChangedEvent +=
            new EventHandler<CollectionChangeEventArgs<IBoiIndexedData
                             this.LogChannels_Changed);
```

Callouts: Typesafe Collections; Parameterized Queries (No SQL Injection attacks); Relation Maintenance through Event Handlers

FIG. 22h

METHOD AND APPARATUS FOR OILFIELD DATA REPOSITORY

CROSS REFERENCE TO RELATED APPLICATIONS

This application claims priority under 35 U.S.C. §119 to U.S. Provisional Patent Application No. 60/852,175, filed on Oct. 16, 2006.

BACKGROUND OF THE INVENTION

1. Field of the Invention

The present invention relates to techniques for performing oilfield operations relating to subterranean formations having reservoirs therein. More particularly, the invention relates to techniques for performing oilfield operations involving an analysis of reservoir operations, and the impact on such oilfield operations.

2. Background of the Related Art

Oilfield operations, such as surveying, drilling, wireline testing, completions, simulation, planning and oilfield analysis, are typically performed to locate and gather valuable downhole fluids. Various aspects of the oilfield and its related operations are shown in FIGS. 1A-1D. As shown in FIG. 1A, surveys are often performed using acquisition methodologies, such as seismic scanners to generate maps of underground structures. These structures are often analyzed to determine the presence of subterranean assets, such as valuable fluids or minerals. This information is used to assess the underground structures and locate the formations containing the desired subterranean assets. Data collected from the acquisition methodologies may be evaluated and analyzed to determine whether such valuable items are present, and if they are reasonably accessible.

As shown in FIG. 1B-1D, one or more wellsites may be positioned along the underground structures to gather valuable fluids from the subterranean reservoirs. The wellsites are provided with tools capable of locating and removing hydrocarbons from the subterranean reservoirs. As shown in FIG. 1B, drilling tools are typically advanced from the oil rigs and into the earth along a given path to locate the valuable downhole fluids. During the drilling operation, the drilling tool may perform downhole measurements to investigate downhole conditions. In some cases, as shown in FIG. 1C, the drilling tool is removed and a wireline tool is deployed into the wellbore to perform additional downhole testing.

After the drilling operation is complete, the well may then be prepared for production. As shown in FIG. 1D, wellbore completions equipment is deployed into the wellbore to complete the well in preparation for the production of fluid therethrough. Fluid is then drawn from downhole reservoirs, into the wellbore and flows to the surface. Production facilities are positioned at surface locations to collect the hydrocarbons from the wellsite(s). Fluid drawn from the subterranean reservoir(s) passes to the production facilities via transport mechanisms, such as tubing. Various equipments may be positioned about the oilfield to monitor oilfield parameters and/or to manipulate the oilfield operations.

During the oilfield operations, data is typically collected for analysis and/or monitoring of the oilfield operations. Such data may include, for example, subterranean formation, equipment, historical and/or other data. Data concerning the subterranean formation is collected using a variety of sources. Such formation data may be static or dynamic. Static data relates to, for example, formation structure and geological stratigraphy that define the geological structure of the subterranean formation. Dynamic data relates to, for example, fluids flowing through the geologic structures of the subterranean formation over time. Such static and/or dynamic data may be collected to learn more about the formations and the valuable assets contained therein.

Sources used to collect static data may be seismic tools, such as a seismic truck that sends compression waves into the earth as shown in FIG. 1A. These waves are measured to characterize changes in the density of the geological structure at different depths. This information may be used to generate basic structural maps of the subterranean formation. Other static measurements may be gathered using core sampling and well logging techniques. Core samples may be used to take physical specimens of the formation at various depths as shown in FIG. 1B. Well logging typically involves deployment of a downhole tool into the wellbore to collect various downhole measurements, such as density, resistivity, etc., at various depths. Such well logging may be performed using, for example, the drilling tool of FIG. 1B and/or the wireline tool of FIG. 1C. Once the well is formed and completed, fluid flows to the surface using production tubing as shown in FIG. 1D. As fluid passes to the surface, various dynamic measurements, such as fluid flow rates, pressure, and composition may be monitored. These parameters may be used to determine various characteristics of the subterranean formation.

Sensors may be positioned about the oilfield to collect data relating to various oilfield operations. For example, sensors in the drilling equipment may monitor drilling conditions, sensors in the wellbore may monitor fluid composition, sensors located along the flow path may monitor flow rates, and sensors at the processing facility may monitor fluids collected. Other sensors may be provided to monitor downhole, surface, equipment or other conditions. The monitored data is often used to make decisions at various locations of the oilfield at various times. Data collected by these sensors may be further analyzed and processed. Data may be collected and used for current or future operations. When used for future operations at the same or other locations, such data may sometimes be referred to as historical data.

The processed data may be used to predict downhole conditions, and make decisions concerning oilfield operations. Such decisions may involve well planning, well targeting, well completions, operating levels, production rates and other operations and/or conditions. Often this information is used to determine when to drill new wells, re-complete existing wells, or alter wellbore production.

Data from one or more wellbores may be analyzed to plan or predict various outcomes at a given wellbore. In some cases, the data from neighboring wellbores or wellbores with similar conditions or equipment may be used to predict how a well will perform. There are usually a large number of variables and large quantities of data to consider in analyzing oilfield operations. It is, therefore, often useful to model the behavior of the oilfield operation to determine the desired course of action. During the ongoing operations, the operating conditions may need adjustment as conditions change and new information is received.

Techniques have been developed to model the behavior of various aspects of the oilfield operations, such as geological structures, downhole reservoirs, wellbores, surface facilities as well as other portions of the oilfield operation. Typically, there are different types of simulators for different purposes. For example, there are simulators that focus on reservoir properties, wellbore production, or surface processing. Examples of simulators that may be used at the wellsite are described in U.S. Pat. No. 5,992,519 and WO2004/049216.

Other examples of these modeling techniques are shown in Patent/Publication Nos. U.S. Pat. No. 5,992,519, U.S. Pat. No. 6,313,837, WO1999/064896, WO2005/122001, US2003/0216897, US2003/0132934, US2005/0149307, and US2006/0197759.

Recent attempts have been made to consider a broader range of data in oilfield operations. For example, U.S. Pat. No. 6,980,940 to Gurpinar discloses integrated reservoir optimization involving the assimilation of diverse data to optimize overall performance of a reservoir. In another example, Patent Application No. WO2004/049216 to Ghorayeb discloses an integrated modeling solution for coupling multiple reservoir simulations and surface facility networks. Other examples of such recent attempts are disclosed in Patent/Publication/Application Nos. U.S. Pat. No. 6,018,497, U.S. Pat. No. 6,078,869, U.S. Pat. No. 6,106,561, U.S. Pat. No. 6,230,101, U.S. Pat. No. 7,164,990, GB2336008, US2006/0129366, US2004/0220846, US2006/0184329, and U.S. Ser. No. 10/586,283. Some techniques involve mapping data between a data base format and an object oriented format are described, for example, in European Patent Application Nos. 1383056, 1385100, 1696348, U.S. Pat. Nos. 694,598, 5,765,159, 5,829,006, and PCT Patent Application No. WO1999/032996.

Despite the development and advancement of managing oilfield data for oilfield operations, there remains a need to provide techniques capable of automatically generating an object-oriented application programming interface (or object API) allowing oilfield data to be accessed from a data repository of various formats. It would be desirable to have a system that allows oilfield data throughout the oilfield operation to be stored in a data repository suitable for retrieving large amounts of very specific information. One such example is a relational database, which has a constant time overhead associated with each query therefore suitable for applications that retrieve large datasets infrequently. In some cases, it may be desirable to access oilfield data through object APIs, which emphasize object-to-object navigation. In other cases, it may be desirable to eliminate expensive overhead caused by frequent suboptimal queries that retrieve single items of information. It is further desirable that such techniques be capable of one of more of the following, among others: mapping one application programming interface to multiple data repositories with different formats, accessing oilfield data from different oilfield functions using consistent interface to request data based on oilfield entities, automatically producing and maintaining mappings associating relational data with object data, implementing such mappings by generating a source code of an object library, that when compiled, provides an object view of relational data.

SUMMARY OF THE INVENTION

In general, in one aspect, the invention relates to a method for performing operations of an oilfield having at least one wellsite, a surface network, and a process facility, each wellsite having a wellbore penetrating a subterranean formation for extracting fluid from an underground reservoir therein. The method includes storing oilfield data associated with a plurality of oilfield entities in a first data repository, obtaining a first target metamodel comprising structural description of a first plurality of data entities of the first data repository, obtaining a domain metamodel interleaved with a first mapping specification, the domain metamodel comprising structural description of a domain model for representing the plurality of oilfield entities in an application programming interface, obtaining a mapping specification associating the first target metamodel with the domain metamodel and forming the application programming interface based on the domain metamodel, the first target metamodel, and the first mapping specification using a computer implemented method.

In general, in one aspect, the invention relates to a method for performing operations of an oilfield having at least one wellsite, a surface network, and a process facility, each wellsite having a wellbore penetrating a subterranean formation for extracting fluid from an underground reservoir therein. The method includes storing oilfield data associated with a plurality of oilfield entities in a data repository, obtaining a first structural description of a plurality of data entities of the data repository, obtaining a second structural description of a representation of the plurality of oilfield entities in an application programming interface, at least a portion of the representation of the plurality of oilfield entities is obtained from a reference metamodel, obtaining a mapping specification associating the first structural description with the second structural description, and forming the application programming interface based on the first structural description, the second structural description, and the mapping specification using a computer implemented method.

In general, in one aspect, the invention relates to a system for performing operations of an oilfield having at least one wellsite, a surface network, and a process facility, each wellsite having a wellbore penetrating a subterranean formation for extracting fluid from an underground reservoir therein. The system includes a first structural description of a representation of a plurality of oilfield entities in an application programming interface, wherein the application programming interface comprises an interface layer and an implementation layer, wherein oilfield data associated with the plurality of oilfield entities is stored in a data repository accessible through the application programming interface, a first plurality of hierarchical tasks for forming the interface layer of the application programming interface based on the first structural description, and a code generator kernel for receiving user inputs and invoking the plurality of hierarchical tasks.

In general, in one aspect, the invention relates to a system for performing operations of an oilfield having at least one wellsite, a surface network, and a process facility, each wellsite having a wellbore penetrating a subterranean formation for extracting fluid from an underground reservoir therein. The system includes a first structural description of a plurality of data entities of a data repository, a second structural description of a representation of a plurality of oilfield entities in an application programming interface, wherein oilfield data associated with the plurality of oilfield entities is stored in the data repository, a mapping specification associating the first structural description with the second structural description, a plurality of hierarchical tasks for forming the application programming interface based on the first structural description, the second structural description, and the mapping specification using a computer implemented method, and a code generator kernel for receiving user inputs and invoking the plurality of hierarchical tasks to form the application programming interface.

In general, in one aspect, the invention relates to a method for performing operations of an oilfield having at least one wellsite, a surface network, and a process facility, each wellsite having a wellbore penetrating a subterranean formation for extracting fluid from an underground reservoir therein. The method includes storing oilfield data associated with a plurality of oilfield entities in a data repository, obtaining a first structural description of a plurality of data entities of the data repository, obtaining a second structural description of a representation of the plurality of oilfield entities in an application programming interface, obtaining a mapping specification associating the first structural description with the second structural description, forming an interface layer of the application programming interface based on the second structural description, and forming an implementation layer of the application programming interface based on the first structural description, the second structural description, and the mapping specification using a computer implemented method.

Other aspects and advantages of the invention will be apparent from the following description and the appended claims.

BRIEF DESCRIPTION OF DRAWINGS

So that the above recited features and advantages of the present invention can be understood in detail, a more particular: description of the invention, briefly summarized above, may be had by reference to the embodiments thereof that are illustrated in the appended drawings. It is to be noted, however, that the appended drawings illustrate only typical embodiments of this invention and are therefore not to be considered limiting of its scope, for the invention may admit to other equally effective embodiments.

FIG. 1A depicts an exemplary survey operation being performed by a seismic truck. FIG. 1B depicts an exemplary drilling operation being performed by a drilling tool suspended by a rig and advanced into the subterranean formation. FIG. 1C depicts an exemplary wireline operation being performed by a wireline tool suspended by the rig and into the wellbore of FIG. 1B. FIG. 1D depicts an exemplary production operation being performed by a production tool being deployed from the rig and into a completed wellbore for drawing fluid from the downhole reservoir into a surface facility.

FIG. 2A depicts an exemplary seismic trace of the subterranean formation of FIG. 1A. FIG. 2B depicts exemplary core sample of the formation shown in FIG. 1B. FIG. 2C depicts an exemplary well log of the subterranean formation of FIG. 1C. FIG. 2D depicts an exemplary production decline curve of fluid flowing through the subterranean formation of FIG. 1D.

FIG. 11 shows a portion of an Extensible Markup Language (XML) representation of the domain model and the data model.

FIGS. 22b-22d show exemplary domain-level query.

FIGS. 22e-22f show exemplary property priming.

FIGS. 22g-22h show exemplary generated code structures.

DETAILED DESCRIPTION

Figure 1A:
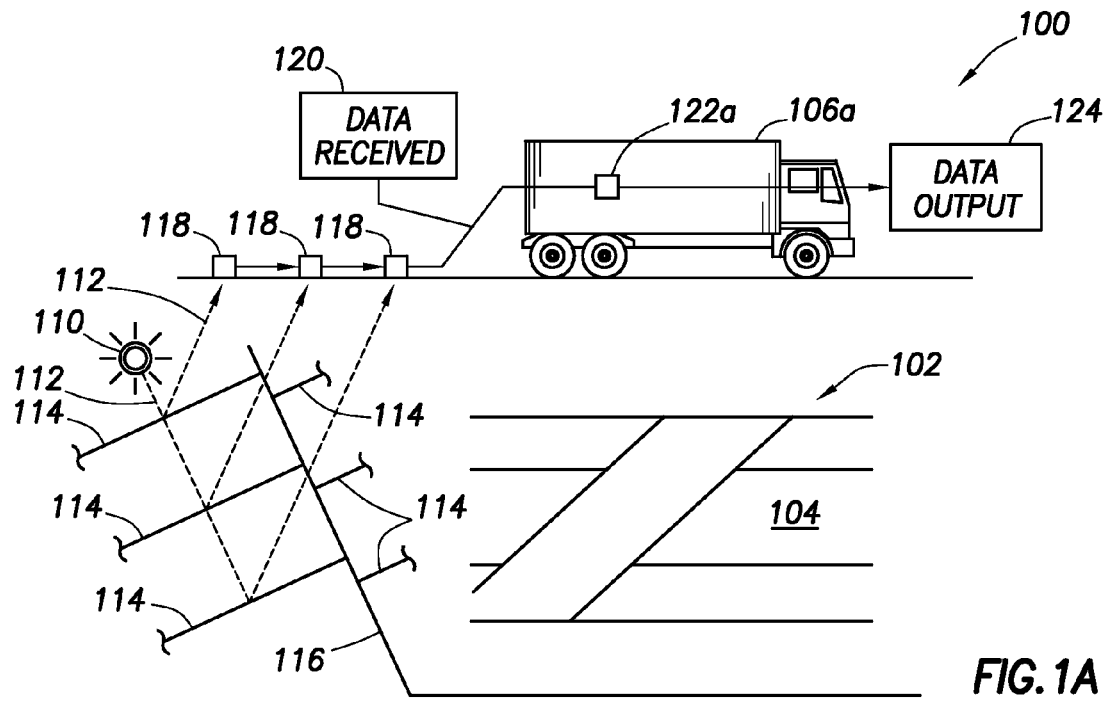
FIGS. 1A-1D show exemplary schematic views of an oilfield having subterranean structures including reservoirs therein and various oilfield operations being performed on the oilfield.

Presently preferred embodiments of the invention are shown in the above-identified figures and described in detail below. In describing the preferred embodiments, like or identical reference numerals are used to identify common or similar elements. The figures are not necessarily to scale and certain features and certain views of the figures may be shown exaggerated in scale or in schematic in the interest of clarity and conciseness.

FIGS. 1A-D show an oilfield (100) having geological structures and/or subterranean formations therein. As shown in these figures, various measurements of the subterranean formation are taken by different tools at the same location. These measurements may be used to generate information about the formation and/or the geological structures and/or fluids contained therein.

FIGS. 1A-1D depict schematic views of an oilfield (100) having subterranean formations (102) containing a reservoir (104) therein and depicting various oilfield operations being performed on the oilfeld (100). FIG. 1A depicts a survey operation being performed by a seismic truck (106a) to measure properties of the subterranean formation. The survey operation is a seismic survey operation for producing sound vibration(s) (112). In FIG. 1A, one such sound vibration (112) is generated by a source (110) and reflects off a plurality of horizons (114) in an earth formation (116). The sound vibration(s) (112) is (are) received in by sensors (S), such as geophone-receivers (118), situated on the earth's surface, and the geophone-receivers (118) produce electrical output signals, referred to as data received (120) in FIG. 1.

In response to the received sound vibrations) (112) representative of different parameters (such as amplitude and/or frequency) of the sound vibration(s) (112). The data received (120) is provided as input data to a computer (122a) of the seismic recording truck (106a), and responsive to the input data, the recording truck computer (122a) generates a seismic data output record (124). The seismic data may be further processed as desired, for example by data reduction.

Figure 1B:
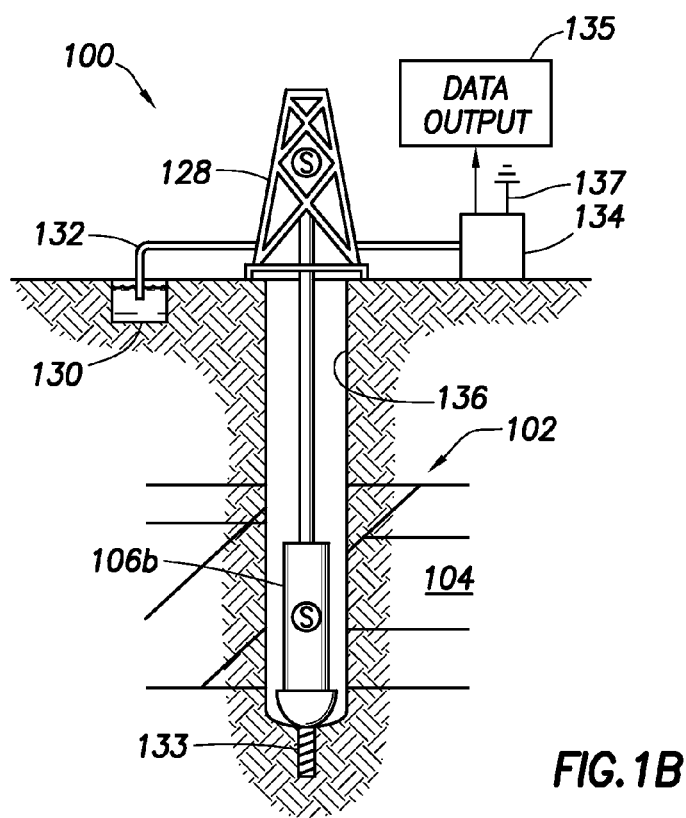

FIG. 1B depicts a drilling operation being performed by a drilling tool (106b) suspended by a rig (128) and advanced into the subterranean formation (102) to form a wellbore (136). A mud pit (130) is used to draw drilling mud into the drilling tool (106b) via flow line (132) for circulating drilling mud through the drilling tool (106b) and back to the surface. The drilling tool (106b) is advanced into the formation to reach reservoir (104). The drilling tool (106b) is preferably adapted for measuring downhole properties. The drilling tool (106b) may also be adapted for taking a core sample (133) as shown, or removed so that a core sample (133) may be taken using another tool.

A surface unit (134) is used to communicate with the drilling tool (106b) and offsite operations. The surface unit (134) is capable of communicating with the drilling tool (106b) to send commands to drive the drilling tool (106b), and to receive data therefrom. The surface unit (134) is preferably provided with computer facilities for receiving, storing, processing, and analyzing data from the oilfield (100). The surface unit (134) collects data output (135) generated during the drilling operation. Computer facilities, such as those of the surface unit (134), may be positioned at various locations about the oilfield (100) and/or at remote locations.

Sensors (S), such as gauges, may be positioned throughout the reservoir, rig, oilfield equipment (such as the downhole tool), or other portions of the oilfield for gathering information about various parameters, such as surface parameters, downhole parameters, and/or operating conditions. These sensors (S) preferably measure oilfield parameters, such as weight on bit, torque on bit, pressures, temperatures, flow rates, compositions and other parameters of the oilfield operation.

The information gathered by the sensors (S) may be collected by the surface unit (134) and/or other data collection sources for analysis or other processing. The data collected by the sensors (S) may be used alone or in combination with other data. The data may be collected in a database and all or select portions of the data may be selectively used for analyzing and/or predicting oilfield operations of the current and/or other wellbores.

Data outputs from the various sensors (S) positioned about the oilfield may be processed for use. The data may be historical data, real time data, or combinations thereof. The real time data may be used in real time, or stored for later use. The data may also be combined with historical data or other inputs for further analysis. The data may be housed in separate databases, or combined into a single database.

The collected data may be used to perform analysis, such as modeling operations. For example, the seismic data output may be used to perform geological, geophysical, reservoir engineering, and/or production simulations. The reservoir, wellbore, surface and/or process data may be used to perform reservoir, wellbore, or other production simulations. The data outputs from the oilfield operation may be generated directly from the sensors (S), or after some preprocessing or modeling. These data outputs may act as inputs for further analysis.

The data is collected and stored at the surface unit (134). One or more surface units (134) may be located at the oilfield (100), or linked remotely thereto. The surface unit (134) may be a single unit, or a complex network of units used to perform the necessary data management functions throughout the oilfield (100). The surface unit (134) may be a manual or automatic system. The surface unit (134) may be operated and/or adjusted by a user.

The surface unit (134) may be provided with a transceiver (137) to allow communications between the surface unit (134) and various portions (or regions) of the oilfield (100) or other locations. The surface unit (134) may also be provided with or functionally linked to a controller for actuating mechanisms at the oilfield (100). The surface unit (134) may then send command signals to the oilfield (100) in response to data received. The surface unit (134) may receive commands via the transceiver or may itself execute commands to the controller. A processor may be provided to analyze the data (locally or remotely) and make the decisions to actuate the controller. In this manner, the oilfield (100) may be selectively adjusted based on the data collected to optimize fluid recovery rates, or to maximize the longevity of the reservoir and its ultimate production capacity. These adjustments may be made automatically based on computer protocol, or manually by an operator. In some cases, well plans may be adjusted to select optimum operating conditions, or to avoid problems.

Figure 1C:
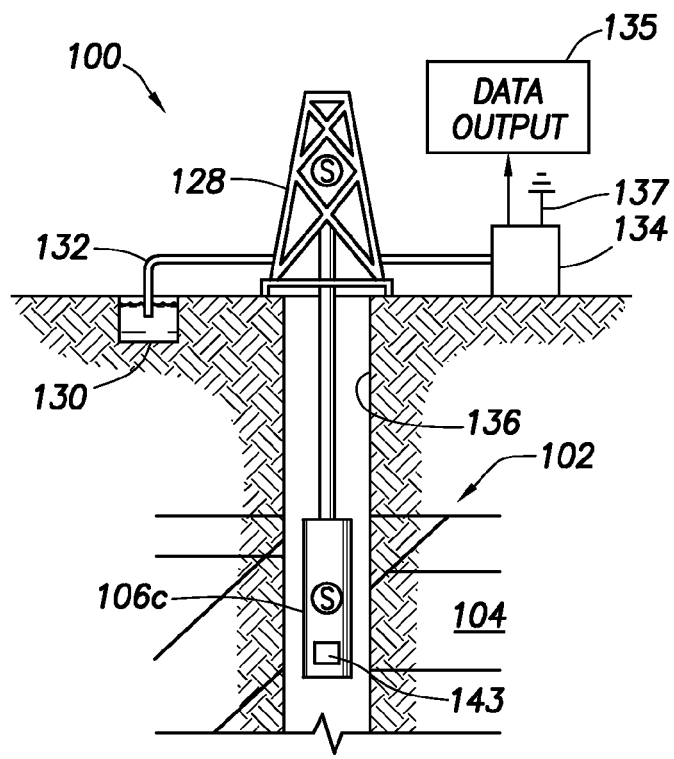

FIG. 1C depicts a wireline operation being performed by a wireline tool (106c) suspended by the rig (128) and into the wellbore (136) of FIG. 1B. The wireline tool (106c) is preferably adapted for deployment into a wellbore (136) for performing well logs, performing downhole tests and/or collecting samples. The wireline tool (106e) may be used to provide another method and apparatus for performing a seismic survey operation. The wireline tool (106c) of FIG. 1C may have an explosive or acoustic energy source (143) that provides electrical signals to the surrounding subterranean formations (102).

The wireline tool (106c) may be operatively linked to, for example, the geophones (118) stored in the computer (122a) of the seismic recording truck (106a) of FIG. 1A. The wireline tool (106c) may also provide data to the surface unit (134). As shown, data output (135) is generated by the wireline tool (106c) and collected at the surface. The wireline tool (106c) may be positioned at various depths in the wellbore (136) to provide a survey of the subterranean formation.

Figure 1D:
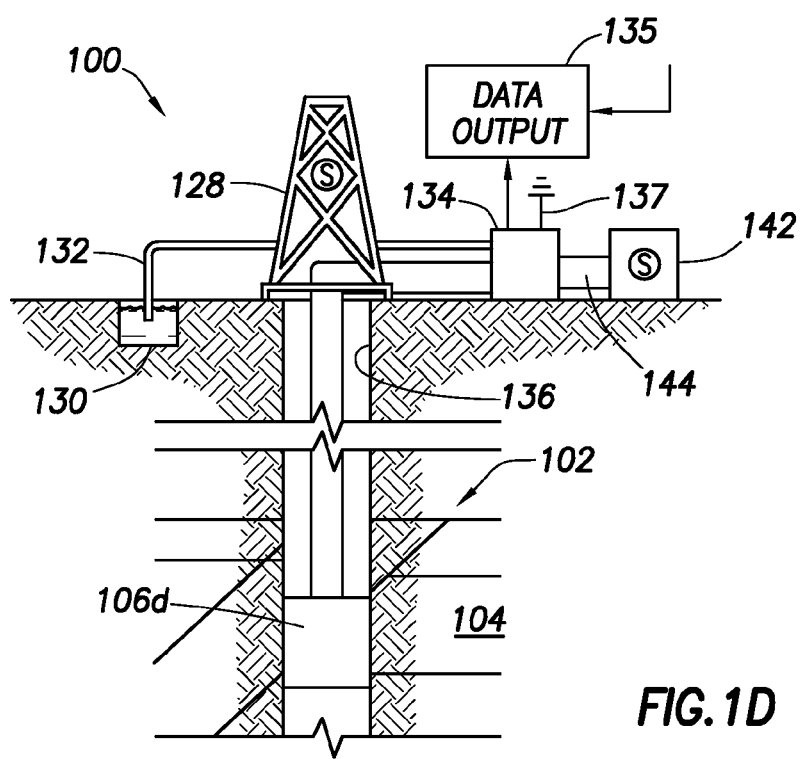

FIG. 1D depicts a production operation being performed by a production tool (106d) deployed from the rig (128) and into the completed wellbore (136) of FIG. 1C for drawing fluid from the downhole reservoirs into surface facilities (142). Fluid flows from reservoir (104) through wellbore (136) and to the surface facilities (142) via a surface network (144). Sensors (S) positioned about the oilfield (100) are operatively connected to a surface unit (142) for collecting data therefrom. During the production process, data output (135) may be collected from various sensors (S) and passed to the surface unit (134) and/or processing facilities. This data may be, for example, reservoir data, wellbore data, surface data, and/or process data.

While FIGS. 1A-1D depict monitoring tools used to measure properties of an oilfield (1100), it will be appreciated that the tools may be used in connection with non-oilfield operations, such as mines, aquifers or other subterranean facilities. Also, while certain data acquisition tools are depicted, it will be appreciated that various measurement tools capable of sensing properties, such as seismic two-way travel time, density, resistivity, production rate, etc., of the subterranean formation and/or its geological structures may be used. Various sensors (S) may be located at various positions along the subterranean formation and/or the monitoring tools to collect and/or monitor the desired data. Other sources of data may also be provided from offsite locations.

The oilfield configuration in FIGS. 1A-1D is not intended to limit the scope of the invention. Part, or all, of the oilfield (100) may be on land and/or sea. Also, while a single oilfield at a single location is depicted, the present invention may be used with any combination of one or more oilfields (100), one or more processing facilities and one or more wellsites. Additionally, while only one wellsite is shown, it will be appreciated that the oilfield (100) may cover a portion of land that hosts one or more wellsites. One or more gathering facilities may be operatively connected to one or more of the wellsites for selectively collecting downhole fluids from the wellsite(s).

Figure 2A:
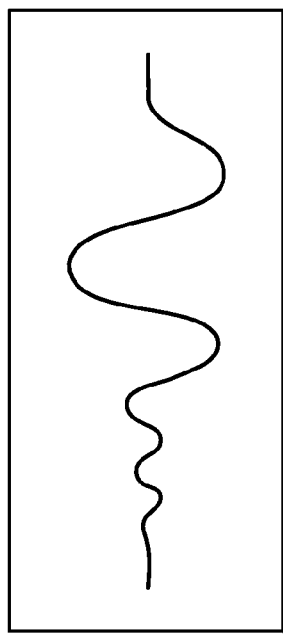
FIGS. 2A-2D are exemplary graphical depictions of data collected by the tools of FIGS. 1A-1D, respectively.
Figure 2B:
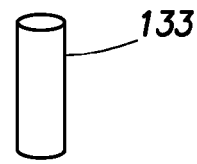
Figure 2C:
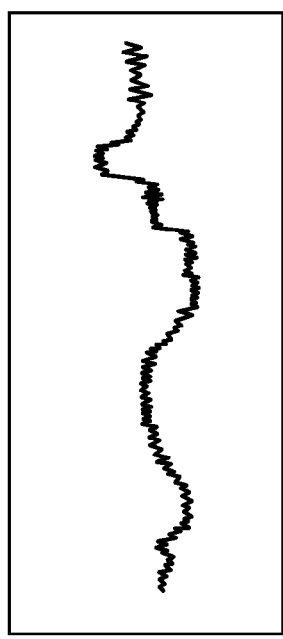
Figure 2D:
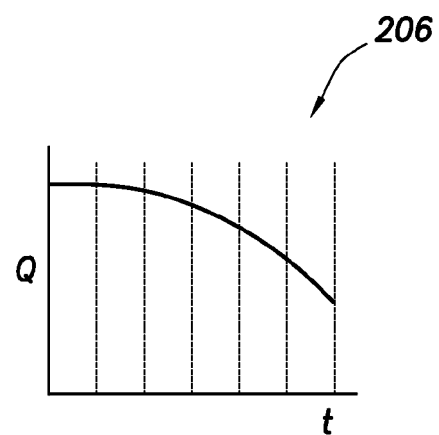

FIGS. 2A-2D are graphical depictions of data collected by the tools of FIGS. 1A-D, respectively. FIG. 2A depicts a seismic trace (202) of the subterranean formation of FIG. 1A taken by survey tool (106a). The seismic trace measures a two-way response over a period of time. FIG. 2B depicts a core sample (133) taken by the drilling tool (106b). The core test typically provides a graph of the density, resistivity, or other physical property of the core sample (133) over the length of the core. Tests for density and viscosity are often performed on the fluids in the core at varying pressures and temperatures. FIG. 2C depicts a well log (204) of the subterranean formation of FIG. 1C taken by the wireline tool (106c). The wireline log typically provides a resistivity measurement of the formation at various depths. FIG. 2D depicts a production decline curve (206) of fluid flowing through the subterranean formation of FIG. 1D taken by the production tool (106d). The production decline curve (206) typically provides the production rate Q as a function of time t.

The respective graphs of FIGS. 2A-2C contain static measurements that describe the physical characteristics of the formation. These measurements may be compared to determine the accuracy of the measurements and/or for checking for errors. In this manner, the plots of each of the respective measurements may be aligned and scaled for comparison and verification of the properties.

FIG. 2D provides a dynamic measurement of the fluid properties through the wellbore. As the fluid flows through the wellbore, measurements are taken of fluid properties, such as flow rates, pressures, composition, etc. As described below, the static and dynamic measurements may be used to generate models of the subterranean formation to determine characteristics thereof.

Figure 3:
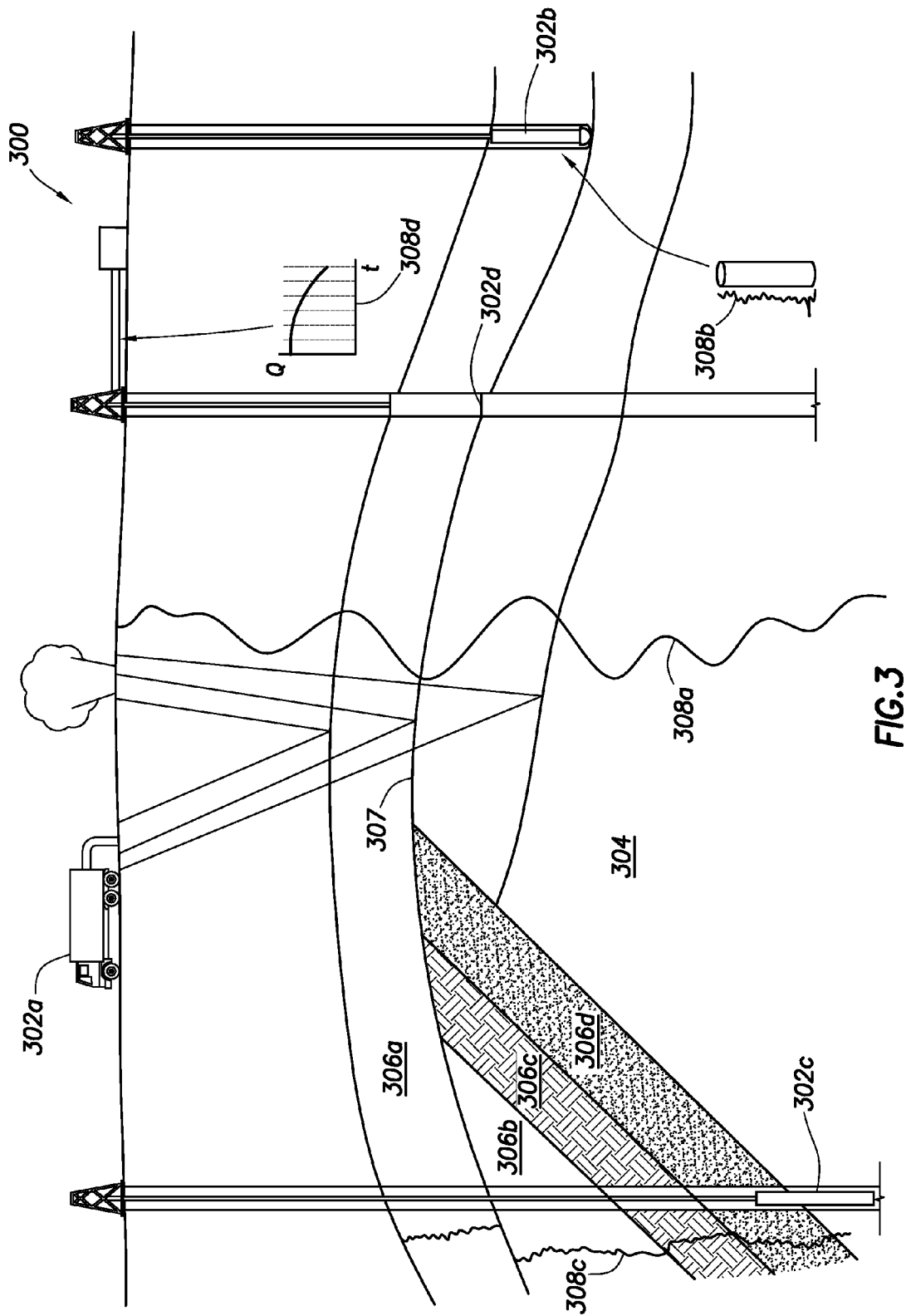
FIG. 3 shows an exemplary schematic view, partially in cross section, of an oilfield having a plurality of data acquisition tools positioned at various locations along the oilfield for collecting data from the subterranean formation.

FIG. 3 is a schematic view, partially in cross section of an oilfield (300) having data acquisition tools (302a), (302b), (302c), and (302d) positioned at various locations along the oilfield for collecting data of a subterranean formation (304). The data acquisition tools (302a-302d) may be the same as data acquisition tools (106a-106d) of FIG. 1, respectively. As shown, the data acquisition tools (302a-302d) generate data plots or measurements (308a-308d), respectively.

Data plots (308a-308c) are examples of static data plots that may be generated by the data acquisition tools (302a-302d), respectively. Static data plot (308a) is a seismic two-way response time and may be the same as the seismic trace (202) of FIG. 2A. Static plot (308b) is core sample data measured from a core sample of the formation (304), similar to the core sample (133) of FIG. 2B. Static data plot (308c) is a logging trace, similar to the well log (204) of FIG. 2C. Data plot (308d) is a dynamic data plot of the fluid flow rate over time, similar to the graph (206) of FIG. 2D. Other data may also be collected, such as historical data, user inputs, economic information, other measurement data, and other parameters of interest.

The subterranean formation (304) has a plurality of geological structures (306a-306d). As shown, the formation has a sandstone layer (306a), a limestone layer (306b), a shale layer (306c), and a sand layer (306d). A fault line (307) extends through the formation. The static data acquisition tools are preferably adapted to measure the formation and detect the characteristics of the geological structures of the formation.

While a specific subterranean formation (304) with specific geological structures is depicted, it will be appreciated that the formation may contain a variety of geological structures. Fluid may also be present in various portions of the formation. Each of the measurement devices may be used to measure properties of the formation and/or its underlying structures. While each acquisition tool is shown as being in specific locations along the formation, it will be appreciated that one or more types of measurement may be taken at one or more location across one or more oilfields or other locations for comparison and/or analysis.

The data collected from various sources, such as the data acquisition tools of FIG. 3, may then be evaluated. Typically, seismic data displayed in the static data plot (308a) from the data acquisition tool (302a) is used by a geophysicist to determine characteristics of the subterranean formation (304). Core data shown in static plot (308b) and/or log data from the well log (308c) is typically used by a geologist to determine various characteristics of the geological structures of the subterranean formation (304). Production data from the production graph (308d) is typically used by the reservoir engineer to determine fluid flow reservoir characteristics.

Figure 4:
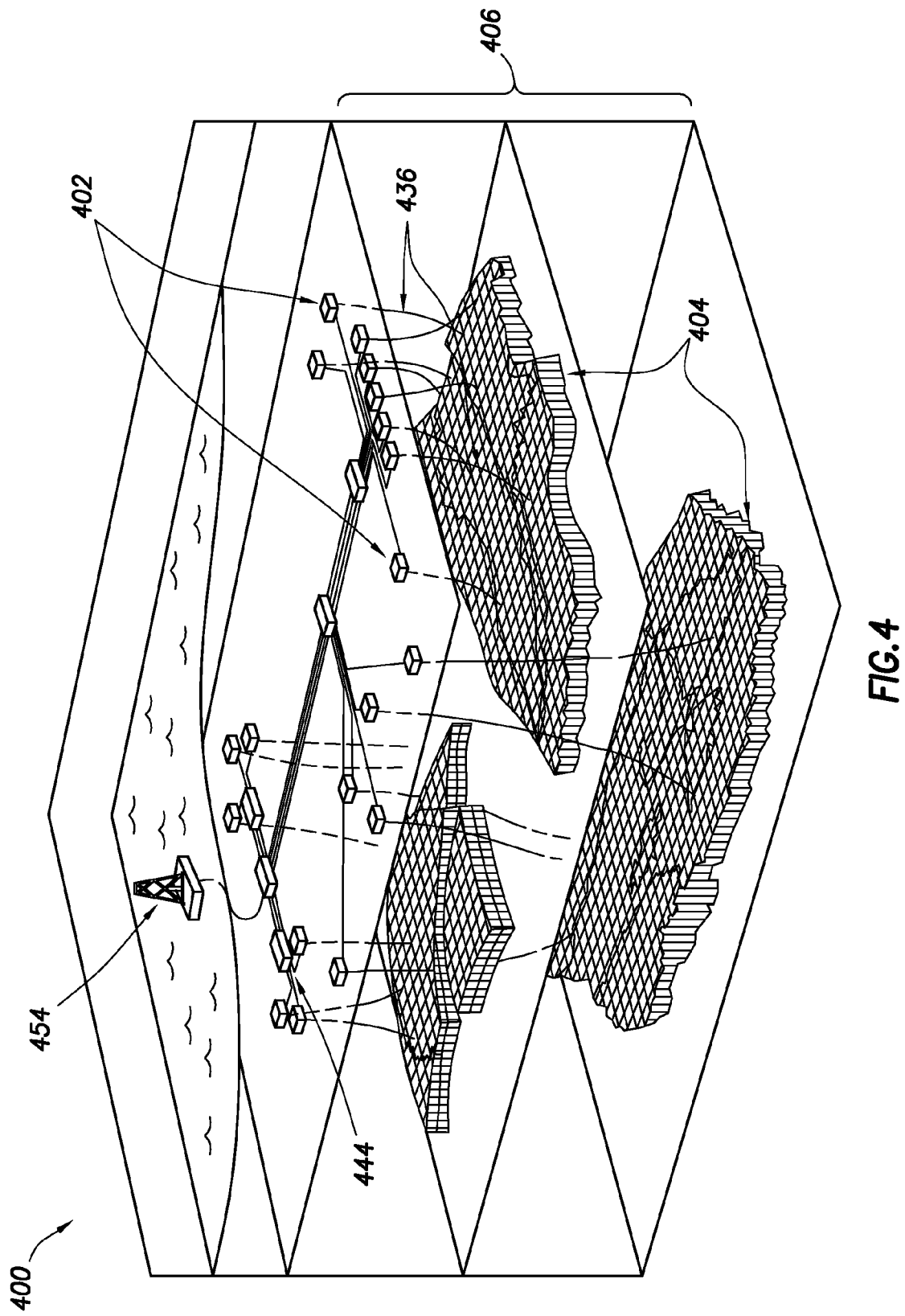
FIG. 4 shows an exemplary schematic view of an oilfield having a plurality of wellsites for producing hydrocarbons from the subterranean formation.

FIG. 4 shows an oilfield (400) for performing production operations. As shown, the oilfield has a plurality of wellsites (402) operatively connected to a central processing facility (454). The oilfield configuration of FIG. 4 is not intended to limit the scope of the invention. Part or all of the oilfield may be on land and/or sea. Also, while a single oilfield with a single processing facility and a plurality of wellsites is depicted, any combination of one or more oilfields, one or more processing facilities and one or more wellsites may be present.

Each wellsite (402) has equipment that forms a wellbore (436) into the earth. The wellbores extend through subterranean formations (406) including reservoirs (404). These reservoirs (404) contain fluids, such as hydrocarbons. The wellsites draw fluid from the reservoirs and pass them to the processing facilities via surface networks (444). The surface networks (444) have tubing and control mechanisms for controlling the flow of fluids from the wellsite to the processing facility (454).

Figure 5:
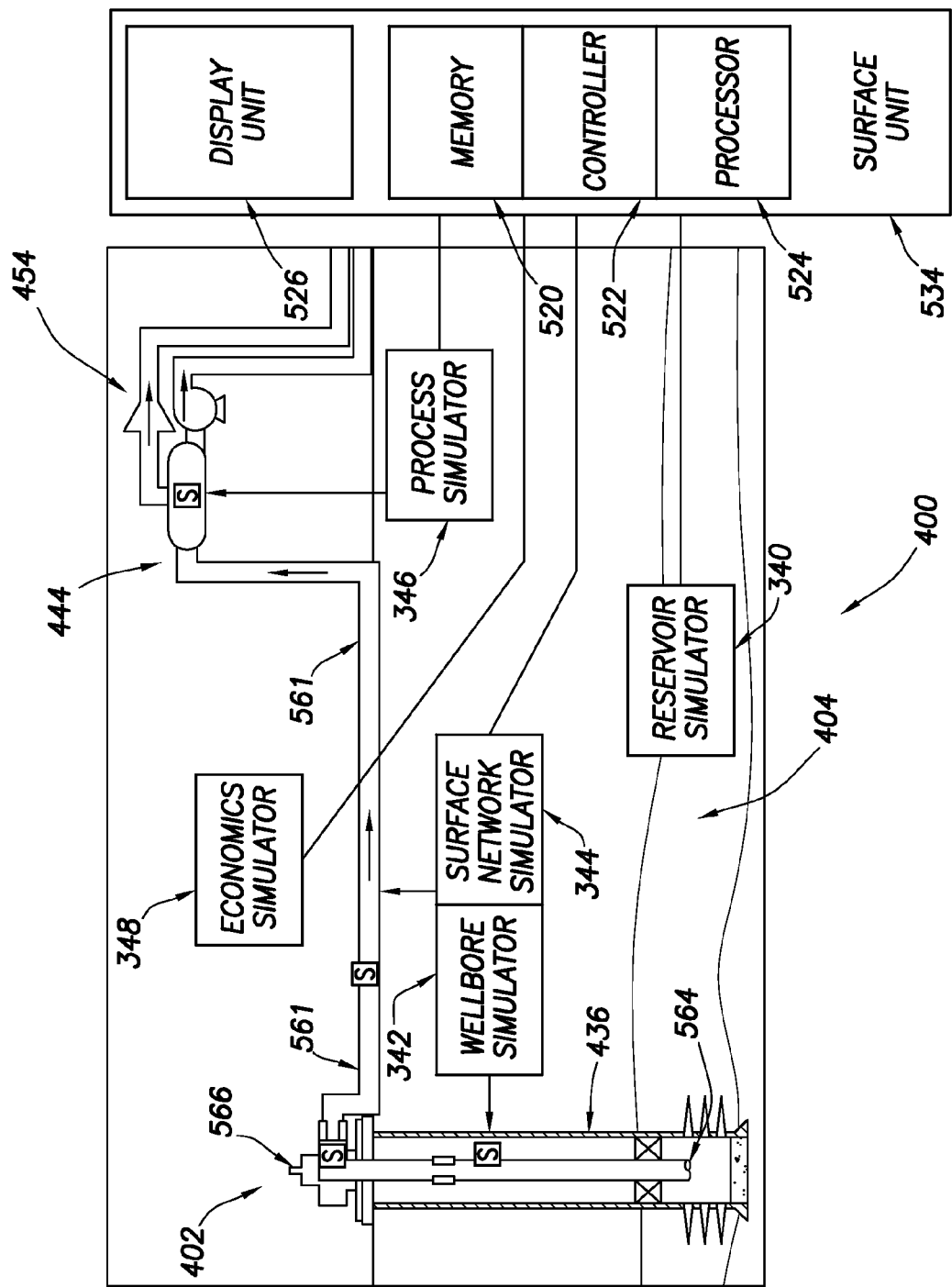
FIG. 5 shows an exemplary schematic diagram of a portion of the oilfield of FIG. 4 depicting the production operation in detail.

FIG. 5 shows a schematic view of a portion (or region) of the oilfield (400) of FIG. 4, depicting a producing wellsite (402) and surface network (444) in detail. The wellsite (402) of FIG. 5 has a wellbore (43.6) extending into the earth therebelow. As shown, the wellbores (436) has already been drilled, completed, and prepared for production from reservoir (404).

Wellbore production equipment (564) extends from a wellhead (566) of wellsite (402) and to the reservoir (404) to draw fluid to the surface. The wellsite (402) is operatively connected to the surface network (444) via a transport line (561). Fluid flows from the reservoir (404), through the wellbore (436), and onto the surface network (444). The fluid then flows from the surface network (444) to the process facilities (454).

As further shown in FIG. 5, sensors (S) are located about the oilfield (400) to monitor various parameters during oilfield operations. The sensors (S) may measure, for example, pressure, temperature, flow rate, composition, and other parameters of the reservoir, wellbore, surface network, process facilities and/or other portions (or regions) of the oilfield operation. These sensors (S) are operatively connected to a surface unit (534) for collecting data therefrom. The surface unit may be, for example, similar to the surface unit (134) of FIGS. 1A-D.

One or more surface units (534) may be located at the oilfield (400), or linked remotely thereto. The surface unit (534) may be a single unit, or a complex network of units used to perform the necessary data management functions throughout the oilfield (400). The surface unit may be a manual or automatic system. The surface unit may be operated and/or adjusted by a user. The surface unit is adapted to receive and store data. The surface unit may also be equipped to communicate with various oilfield equipment. The surface unit may then send command signals to the oilfield in response to data received or modeling performed.

As shown in FIG. 5, the surface unit (534) has computer facilities, such as memory (520), controller (522), processor (524), and display unit (526), for managing the data. The data is collected in memory (520), and processed by the processor (524) for analysis. Data may be collected from the oilfield sensors (S) and/or by other sources. For example, oilfield data may be supplemented by historical data collected from other operations, or user inputs.

The analyzed data (e.g., based on modeling performed) may then be used to make decisions. A transceiver (not shown) may be provided to allow communications between the surface unit (534) and the oilfield (400). The controller (522) may be used to actuate mechanisms at the oilfield (400) via the transceiver and based on these decisions. In this manner, the oilfield (400) may be selectively adjusted based on the data collected. These adjustments may be made automatically based on computer protocol and/or manually by an operator. In some cases, well plans are adjusted to select optimum operating conditions or to avoid problems.

To facilitate the processing and analysis of data, simulators may be used to process the data for modeling various aspects of the oilfield operation. Specific simulators are often used in connection with specific oilfield operations, such as reservoir or wellbore simulation. Data fed into the simulator(s) may be historical data, real time data or combinations thereof. Simulation through one or more of the simulators may be repeated or adjusted based on the data received.

As shown, the oilfield operation is provided with wellsite and non-wellsite simulators. The wellsite simulators may include a reservoir simulator (340), a wellbore simulator (342), and a surface network simulator (344). The reservoir simulator (340) solves for hydrocarbon flow through the reservoir rock and into the wellbores. The wellbore simulator (342) and surface network simulator (344) solves for hydrocarbon flow through the wellbore and the surface network (444) of pipelines. As shown, some of the simulators may be separate or combined, depending on the available systems.

The non-wellsite simulators may include process (346) and economics (348) simulators. The processing unit has a process simulator (346). The process simulator (346) models the processing plant (e.g., the process facilities (454)) where the hydrocarbon(s) is/are separated into its constituent components (e.g., methane, ethane, propane, etc.) and prepared for sales. The oilfield (400) is provided with an economics simulator (348). The economics simulator (348) models the costs of part or the entire oilfield (400) throughout a portion or the entire duration of the oilfield operation. Various combinations of these and other oilfield simulators may be provided.

Figure 6:
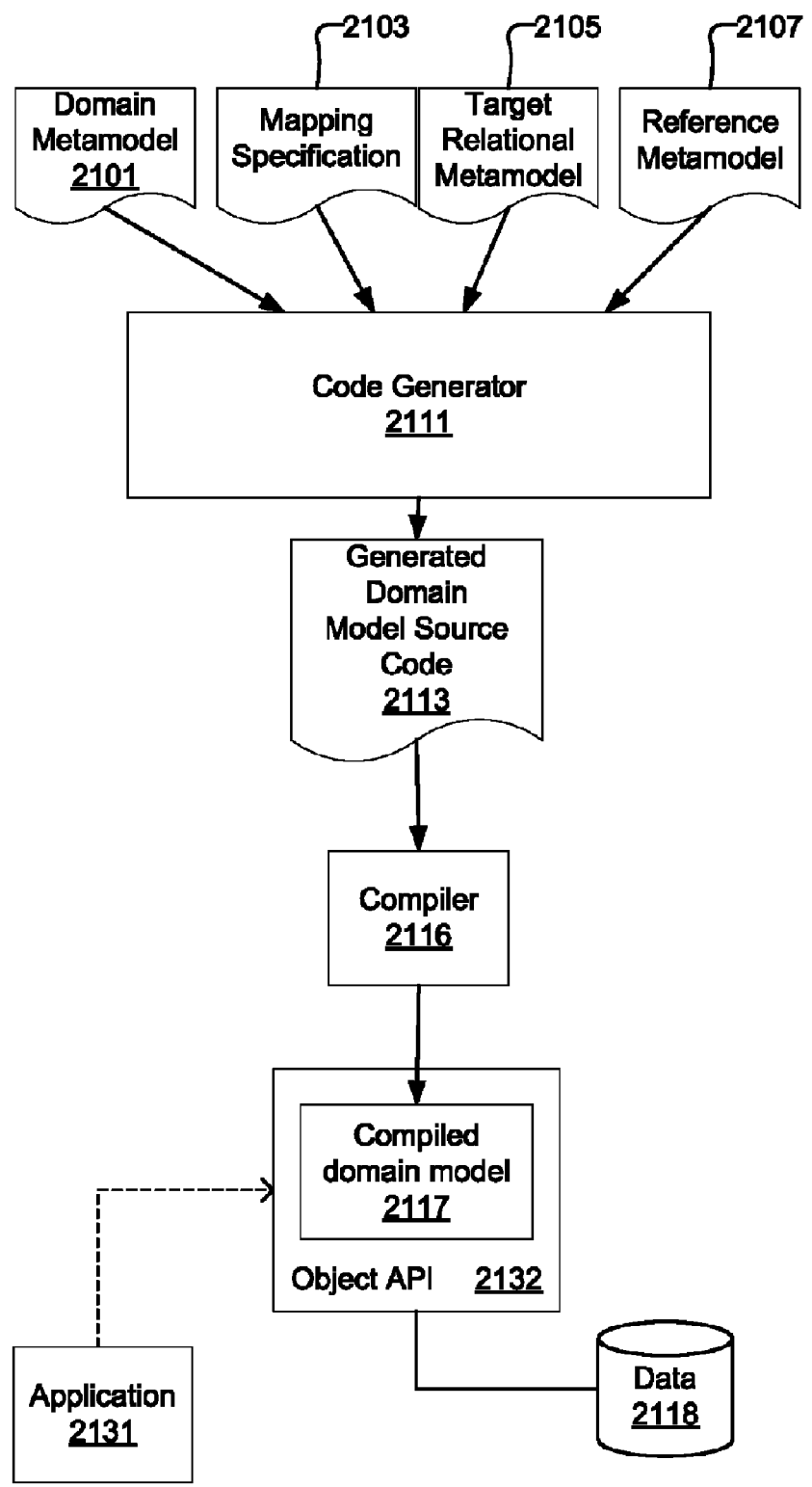
FIG. 6 shows a system for converting a domain metamodel to a compiled domain model.

As described above, data plots (308a-308c) are examples of oilfield data entities collected from various sources, such as the data acquisition tools of FIG. 3. These oilfield data entities are associated with oilfield entities. For example, the seismic trace (308a) may be associated with the formation (304) and the core sample data (308b) may be associated with a portion of the formation (304) such as the sandstone layer (306a), the limestone layer (306b), the shale layer (306c), the sand layer (306d), or the fault line (307) where the core sample is collected. In another example, the logging trace (308c) may be associated with a well monitored by the data acquisition tool (302c) and the fluid flow rate plot (308d) may be associated with the well monitored by the data acquisition tool (302d). The collected oilfield data may be stored in a data repository or multiple data repositories (2118) as shown in FIG. 6 later. The data repository or multiple data repositories (2118) may; be located in the surface unit (534) of FIG. 5. Data may then be simulated, analyzed, or otherwise processed by wellsite and non-wellsite simulators or other modeling tools as described above. The processed data, such as results generated by the wellsite and non-wellsite simulators, may then be further stored in the data repository or multiple data repositories. Data may be stored using different formats depending on, for example a particular oilfield function (e.g., drilling function, production function, reservoir engineering, economic function, etc.) for which data is collected or generated.

In general, in one aspect the invention relates to technology for accessing data (e.g., oilfield data) stored in a data repository or multiple data repositories using an interface independent of the various formats of the data repository or multiple data repositories. This interface may be automatically generated. Examples of such data repository include relational database, object oriented database, or other forms of database or data store. An example of this interface is an object oriented application programming interface (e.g., the Object API (2132) as shown in FIG. 6 later). Object-relational mapping (ORM) is a term that describes software technology that allows a program to view data stored in a database (e.g., a relational database) through an object-oriented application programming interface.

Relational databases are designed to store large amounts of information. Information in relational databases is stored in different tables, each defined to contain one or more columns, each column containing a primitive item of information—for example, a string or a number. Programs add information to a relational database by adding rows (containing values for one or more defined table-defined columns) to database tables, and find information in relational databases by issuing queries. Typically, all operations on a relational database are performed by operations expressed in a textual query language, such as Structured Query Language (SQL). The relational database is an example of the data repository or multiple data repositories described above. The tables, columns, rows, and the primitive item of information are examples of data base entities. The relational interface such as queries or SQL are examples of commands for accessing data in the data repository or multiple data repositories.

The term "relational database" refers to the fact that a column in a row of one table can identify a row of another (or the same) table. This reference mechanism supports relations between rows of information. Relational databases can enforce consistency of information both between table rows and within table rows. Database designers may choose to declare integrity constraints that ensure that column data is valid; for example that a column can never refer to a nonexistent table row. Defining such constraints is a recommended good practice, but is not mandatory. Even when integrity constraints are designed, they are not as readily visible to database programmers, as is table structure. Thus, while the physical model of data in the database—the tables and their columns—may be visible to developers, the conceptual model—the high-level concepts represented by the tables and the relationships between tables, which gives significant meaning to the data—is not immediately obvious.

In addition, the definitions of the tables included within a relational database can change over time. When these definitions change, any application using a relational interface to access data in the database may also change to assure proper operation of the application. When a database is used by many, independently-developed applications, it can be extremely difficult to identify all applications that are to be changed in response to a database definition change.

More importantly, designers desire the flexibility to make applications store their data in a plurality of relational databases (e.g., the multiple data repositories described above) having different physical models (e.g., based on a particular oilfield entity associated with the stored data) and conceptual models (e.g., based on a particular oilfield function for which data is collected or generated for). Good software engineering practices include the use of a software layer that insulates the application from the underlying database. The adaptor presents a single, stable interface for the application program, while supporting multiple "backend" implementations that are specific to each underlying database to be used. This approach solves the database portability problem for the application programmer, but still requires significant coding investment for each backend database to be used. Moreover, when the backend coding task is difficult (because programming against relational databases is difficult), the adaptor layer tends toward exposing a least-common-denominator view over the intersection of databases to be supported. Such views can ultimately render the adaptor useless, as often critical and/or valuable information cannot be stored and retrieved through the adaptor, leading programmers to circumvent the adaptor.

These characteristics of relational programming can be the root-level cause of many errors that only occur after an application has been delivered to its end users, and has motivated the software industry to develop ORM tools.

Object-oriented application programming interfaces (APIs) (e.g., the Object API (2132) of FIG. 6) are designed to make types and relationships explicit and obvious for programmers. Object interfaces such as the object APIs are well-suited to expressing high-level "domain-specific" concepts. Domain refers to a relevant set of entities. For example, oilfield domain may refer to a collection of oilfield data. In other examples, a domain associated with a particular oilfield function (e.g., drilling function, production function, reservoir engineering, economic function, etc.) may refer to a portion of the collection of oilfield data related to the particular oilfield function. In these exemplary domains, data object may be defined relating to physical oilfield entities (e.g., a formation, a well, a process facility, etc.). Entities (or domain entities) such as object types may be defined within a taxonomic hierarchy of a domain, in which subtypes inherit the generic behavior of supertypes, but either refine that behavior or add additional behavior. Furthermore, well-designed object interfaces completely encapsulate implementation details from applications that use the interfaces. This encapsulation allows the interface to remain stable while the underlying implementation changes.

Object-based programming languages (e.g., used for application (2131) as shown in FIG. 6 later) in general do not provide query, persistence, or integrity that relational databases provide. However, a developer may explicitly declare types and relationships in object interfaces, and a compiler for an object-oriented programming language can verify that the application is performing legal operations on objects in an object-oriented interface. The explicit declarations are a significant advantage for developers because the compiler can verify that the application is not attempting to violate domain-level concepts, before the application runs.

However, query and persistence remains an issue for programmers using an object API. It is common practice in the software industry for developers to write his/her own persistence mechanisms from scratch, and also to simply not provide a query mechanism. Developers develop some mission-critical software for a long life cycle, and occasionally for accessing large persistent data stores. These issues also motivate tools to create object-relational mapping adaptors.

ORM tools adapt relational programming interfaces (such as queries or SQL) to object-oriented application programming interfaces, and give programmers the encapsulation, expressiveness, and compile-time safety of object interfaces while taking advantage of the efficiency and integrity offered by relational databases. The fundamental service of object-relational mapping is to translate between data stored in columns of database table rows and data expressed through properties of related objects defined in a type hierarchy. ORM allows applications to perform the database operations of create, update, delete through the compile-time-safe object API while storing the data in the relational database. Some ORM tools also permit applications to perform the database operation of find with respect to data. Data may be, for example, oilfield data shown in FIGS. 2A-2D and FIG. 3.

It should be noted that relational databases excel at retrieving large amounts of very specific information. This is because relational databases retrieve data in a set-oriented manner, efficiently returning data that matches a query predicate in a single (potentially very large) dataset. This relational query interface lends itself to applications that retrieve large datasets infrequently. Consequently, there is a constant time overhead associated with each query. Ultimately, the overhead causes frequent queries that retrieve single items of information to be very expensive. Unfortunately, object APIs, which emphasize object-to-object navigation, can end up exercising a relational database for these suboptimal queries when the object model is mapped onto a relational database.

ORM tools come in many forms. Common to all tools is the need to state how relational data will be mapped to object data. Producing and maintaining these mappings can be an onerous task. An example of this invention includes an embodiment of an ORM tool that implements the mapping between an object interface and a relational interface by generating the source code of an object library, that when compiled, provides an object view (e.g., for accessing data through the object APIs) of relational data (e.g., stored in the relational data base). The tool reduces the workload of software developers when creating and maintaining the object-relational mapping. The ORM tool infers (or derive) much of the information that would ordinarily be entered manually by a person developing or maintaining a mapping. The inferred information includes: 1) defaults for properties of domain objects, 2) queries to find database entities that map to domain objects, 3) queries to preload domain object properties with information from a complex web of interrelated database entities (thus minimizing the suboptimal small query result usage pattern), and 4) queries to follow relationships between database entities that are equivalent to relationships between domain objects.

FIG. 6 shows a system for converting a domain metamodel to a compiled domain model. Specifically, the system in FIG. 6 includes a code generator (2111) that creates object-relational mappings from specifications. The object-relational mappings are embodied in source format as the generated domain source code (2113) or in the compiled format as the compiled domain model (2117). Four artifacts are input to the code generator (2111). The first artifact, the domain metamodel (2101), describes the object models to be created as domain entities within a domain. The domain metamodel (2101) is a domain ontology (i.e., data model) that describes the structure of domain entities (e.g., objects) defined within a taxonomic type hierarchy and information associated with the domain entities, such as object properties that describe relations between objects, and object properties that describe simple non-relational data associated with objects. Non-relational data associated with objects includes, for example, strings, numbers, and dates. The second artifact is a mapping specification (2103). The mapping specification (2103) describes how to map the object models created from the domain metamodel (2101) to one or more relational databases at a structural level. The third artifact is the target relational metamodel (2105). The target relational metamodel (2105) describes the model of a particular relational database for which the code generator will create code. The code permits mapping the object models using the mapping specification (2103). The fourth artifact describes a reference metamodel (2107), which helps to provide information required to make the domain metamodel (2101) complete. The reference metamodel (2107) is optional and can be omitted if the domain metamodel (2101) is already complete. The reference metamodel (2107) can also be identical to the target relational metamodel (2105), but may also describe a very different model.

The metamodels used as the target relational metamodel (2105) and possibly the reference metamodel (2107) are typically developed independently of the domain metamodel (2101). Developers can expect that the information needed to populate them already exists in some machine-readable form when they begin to define the domain metamodel (2101). In particular, the metamodel of a database can be used to supply information missing from the domain metamodel (2101), allowing the developer of the domain metamodel (2101) to specify only as much information as needed to make the combination of the domain metamodel (2101) and the reference metamodel (2107) complete.

The output from the code generator (2111) is source code (2113) in a particular programming language. The source code (2113) can be compiled by a compiler (2116) into a compiled domain model (2117), which may include a library of domain objects (i.e., an object library). A domain object may relate to a type of oilfield entity (e.g., a well, a formation, etc.). Domain object instances may be created (or instantiated) during execution (or run time) of the application (2131) from a domain object. A domain object instance may relate to a particular oilfield entity (e.g., a particular well in an oilfield, a particular portion of a formation, etc.) Accordingly, an object API (2132) may be formed using the compiled domain model (2117) that allows an application (2131) to create, update, delete, and find data (2116) in a relational database (2118) described by the input database metamodel, for example, the target relational metamodel (2105). More details of an exemplary implementation of the object API (2132) are described in FIG. 19 below.

Figure 7:
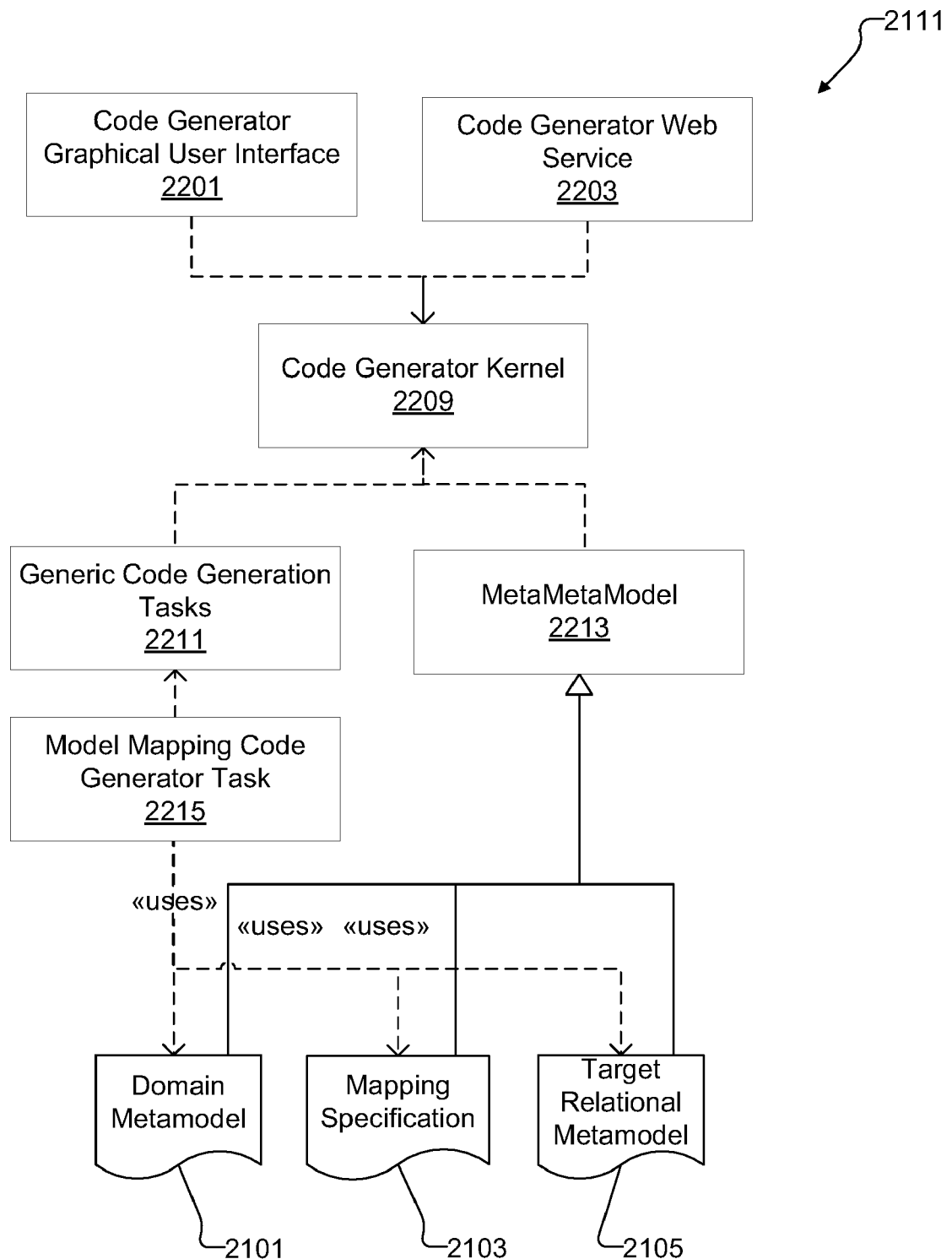
FIG. 7 shows the software components for a code generator.

FIG. 7 shows the elements of the code generator (2111) in FIG. 6. The code generator includes a kernel (2209) that drives the code generator process, a Generic Code Generation Tasks model (2211) that describes the basic definitions of tasks, a Model Mapping Code Generator Task (2215) for generating code that maps between domain metamodel (2101) and target relational meta model (2105) based on the mapping specification (2103), a metametamodel (2213) that describes the structures of the domain metamodel (2101), the target relational metamodel (2105) and the mapping specification (2103) so that the contents of these input artifacts to the code generator (2111) can be interpreted, and finally, code that invokes code generation. The code that invokes code generation invokes either from a graphical user interface (2201) or from a web service (2203). The Generic Code Generation Tasks model (2211) allows the Model Mapping Code Generator Task (2215) to be defined hierarchically. Each hierarchically defined task may relates to one of model level task associated with a domain model or a database table, entity level task associated with a domain entity or a database entity, or property level task associated with a property of a domain entity or a database entity. Additional tasks may be created or configured, using the Generic Code Generation Tasks model (2211), to supplement the Model Mapping Code Generator Task (2215) to support different structures of the data repository, for example a modification in the relational database structure.

Figure 8:
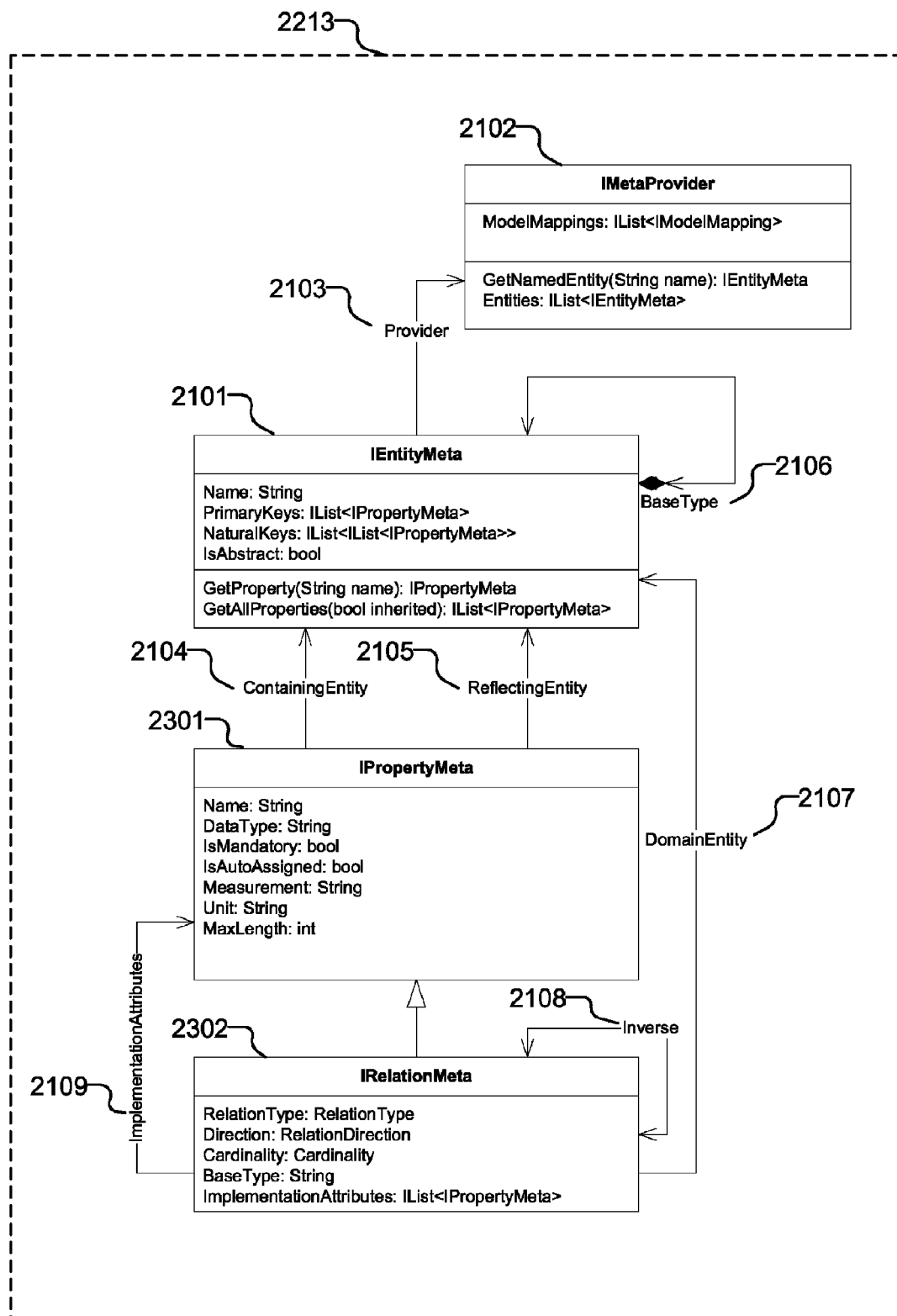
FIG. 8 shows a metameta model in Universal Modeling Language (UML) format for describing the domain metamodel and the relational metamodel.

FIG. 8 shows a portion of the metametamodel (2213) in FIG. 7, depicted as a Unified Modeling Language (UML) static structure diagram. Detail descriptions of the UML standard may be found in www.uml.org. Here, the metametamodel (2213) describes the structure of the information conveyed by domain metamodel (2101), target relational metamodel (2105) and reference metamodel (2107). This metametamodel (2213) also includes an interface module IMetaProvider (2102) and works equally well for describing both domain and relational metamodels. For describing the domain metamodel (2101), the IEntityMeta (2101) contains structural description of a domain entity (e.g., an object or domain object), the IPropertyMeta (2301) contains structural description of non-relational data associated with the object (e.g., a property associated with the object), and IRelationalMeta (2302) contains structural description of relations between objects (e.g., a link or relation associated with the object). In addition, relationships (2103)-(2109) may be also defined in the metatmetamodel (2213).

For describing the target relational metamodel (2105), the IEntityMeta (2101) contains structural description of a database entity (e.g., a table of a relational database), the IPropertyMeta (2301) contains structural description of non-relational data associated with the database entity (e.g., an attribute of a relational database), and IRelationalMeta (2302) contains structural description of relations between database entities (e.g., a foreign key of a relational database).

Figure 9:
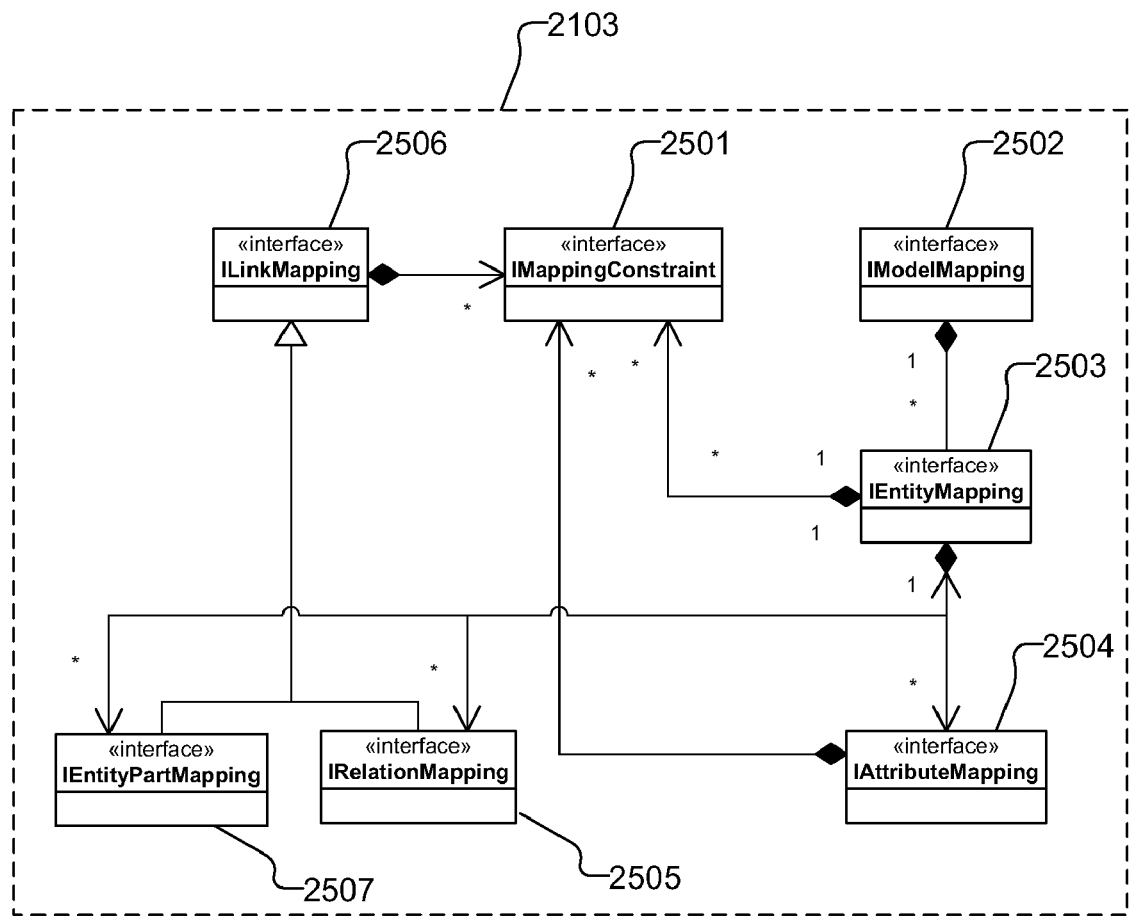
FIG. 9 shows a metamodel in UML format for mapping specifications.

FIG. 9 shows a portion of the metametamodel (2213) in FIG. 7, depicted as a Unified Modeling Language (UML) static structure diagram for describing the mapping specification (2103). Here, the mapping specification (2103) is shown as a hierarchical structure including a mapping module IModelMapping (2502), which may include one or more entity mapping modules IEntityMapping (2503). The entity mapping module IEntityMapping (2503) may consist one or more attribute mapping modules IAttributeMapping (2504), one or more relation mapping modules IRelationMapping (2505), and one or more entity part mapping modules IEntityPartMapping (2507), The IRelationMapping (2505) and the IEntityPartMapping (2507) may together form the ILinkMapping (2506). In addition, the IEntityMapping (2503), the IAttributeMapping (2504), and the ILinkMapping (2506) may be conditioned by one or more mapping constraints IMappingConstraint (2501).

FIG. 9 describes the interfaces that expose declared mappings between metamodels in UML format (e.g., mappings that are encoded in the XML mapping file to map between domain and relational metamodels).

The UML standard is well known to those skilled in art. For clarity, the significance of the decorations at the end of the links between the interfaces is reiterated here.

The "*" and "1" at the end of a link indicate cardinality of the object at that end of the link. "1" indicates one; "*" indicates zero or more. The use of the cardinality decorators is generally implicit in the UML. For example, one ILinkMapping (2506) can refer to multiple IMappingConstraints 2501. Similarly, one IAttributeMapping (2504) and one IEntityMapping (2503) can also refer to many IMappingConstraints. One IEntityMapping can refer to multiple IEntityPartMappings (2507), IRelationMappings (2505) and IAttributeMappings.

The solid diamond indicates that the link is a "composition." For example, an IMappingConstraint cannot exist without being referred to from an IEntityMapping, IAttributeMapping or ILinkMapping. For example, to support the ability to delete an IEntityMapping, any IMappingConstraint objects that the IEntityMapping also refers to need to be deleted.

The simple arrowheads (such as pointing into IMappingConstraint) indicate that the relation is navigable; it is possible to enumerate all of the IMappingConstraints associated with an IEntityMapping, IAttributeMapping or ILinkMapping.

The triangular arrowhead (such as pointing into the bottom of ILinkMapping) indicates an inheritance relation. IEntityPartMapping and IRelationMapping are both subtypes (or subclasses) of ILinkMapping.

Figure 10:
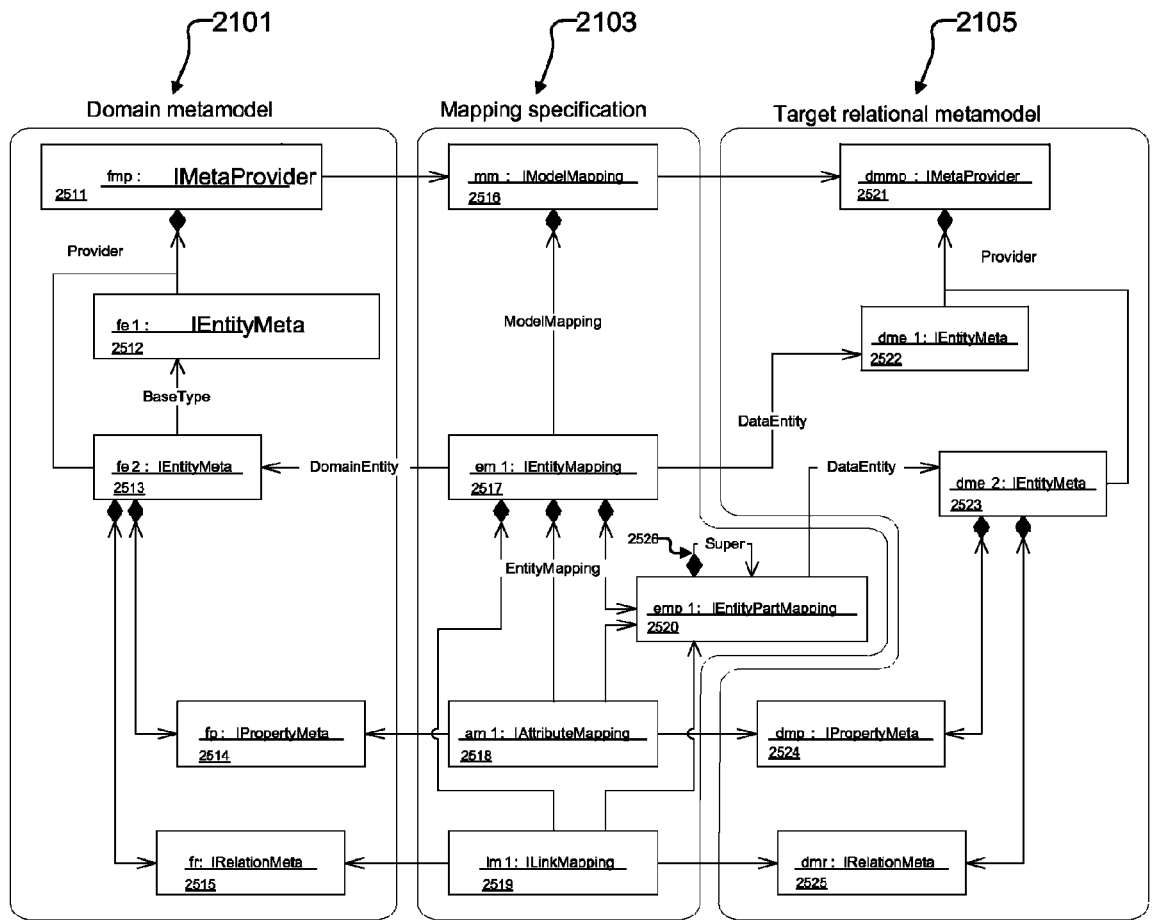
FIG. 10 shows how an example in UML format of a mapping specification relates to the domain metamodel.

FIG. 10 depicts a Unified Modeling Language (UML) static structure diagram for describing the mapping specification (2103) in relation with the domain metamodel (2101) and the target relational metamodel (2105). Specifically, FIG. 10 describes how the mapping specification (2103) relates the domain metamodel (2101) and the target relational metamodel (2105) at a structural level. Not shown in FIG. 10 is the reference metamodel, which supplements information that appears as properties of IPropertyMeta object (2301) and IRelationMeta object (2302) in the domain metamodel (2101) (see, FIG. 8). The reference metamodel may supplement information lacking from the domain metamodel.

As shown in FIG. 10, the domain metamodel (2101) includes fmp:IMetaProvider (2511), fe1:IEntityMeta (2512), fe2:IEntityMeta (2513), fp:IProperty (2514), and fr:IRelationMeta (2515). The mapping specification (2103) includes mm:IModelMapping (2516), em1:EntityMapping (2517), am1:IAttributeMapping (2518), lm1:ILinkMapping (2519), and emp1:IEntityPartMapping (2520). The target relational metamodel (2105) includes dmmp:IMetaProvider (2521), dme1:IEntityMeta (2522), dme2:IEntityMeta (2523), dmp:IProperty (2524), and dmr:IRelationMeta (2525). Each of the fmp:IMetaProvider (2511) and dmmp:IMetaProvider (2521) is an instance of the IMetaProvider (2102). Each of the fe1:EntityMeta (2512), fe2:IEntityMeta (2513), dme1:IEntityMeta (2522) and dme2:IEntityMeta (2523) is an instance of the IEntityMeta (2101). Each of the fp:IProperty (2514) and dmp:IProperty (2524) is an instance of the IMetaProvider (2102)). Each of the fr:IRelationMeta (2515) and dmr:IRelationMeta (2525) is an instance of the IMetaProvider (2102). The mm:IModelMapping (2516) is an instance of the IModelMapping (2502). The am1:IAttributeMapping (2518) is an instance of the IAttributeMapping (2504). The lm1:ILinkMapping (2519) is an instance of the ILinkMapping (2506). The emp1:IEntityPartMapping (2520) is an instance of the IEntityPartMapping (2507).

Further shown in FIG. 1, the mm:IModelMapping (2516) maps the fmp:IMetaProvider (2511) to the dmmp:IMetaProvider (2521) using a hierarchical and recursive mapping structure by way of mappings performed by the em1:IEntityMapping (2517), am1:IAttributeMapping (2518), lm1:ILinkMapping (2519), and emp1:IEntityPartMapping (2520). The emp1:IEntityPartMapping (2520) is shown to have a recursive structure (2526).

One example of a metamodel used as a target metamodel or a reference metamodel is the data dictionary of Seabed. Seabed is a relational database produced by Schlumberger Information Solutions for holding exploration and production information in support of a borehole operation. Other metamodels may also be used by configuring the metametamodel illustrated above to describe the structural format of the information contained in the metamodels so that the information may be provided to the Model Mapping Code Generator Task (2215) (see, FIG. 7).

FIG. 11 shows the domain metamodel and mapping specification. The domain metamodel and the mapping specification are provided to the ORM tool in the form of an XML file (600). The XML file (600) interleaves the domain metamodel with the mapping specification. For example, the domain metamodel may be domain metamodel (2101) shown in FIG. 6. The mapping specification may be the mapping specification (2103) shown in FIG. 6. XML elements having names beginning with "DOG_" introduce domain entities, properties, or relations. The XML elements having names beginning with "Map_" specify mappings. The advantage of interleaving domain and mapping information is that both kinds of information are visible in a single glance when the mapping or domain model is being developed or maintained. In addition, the XML file (600) can convey multiple mappings (i.e., for multiple target data repositories) for a single domain model. Developers benefit by being able to see all mappings for a single domain concept. Consequently, a developer can better maintain consistency between mappings to multiple relational databases.

Within the XML file (600), line (621) is an example of a structure described by IEntityMeta (2101) of FIG. 8, line (622) is an example of a structure described by IEntityMapping (2503) of FIG. 9, line (621) is an example of a structure described by IEntityMeta (2101) of FIG. 8, line (622) is an example of a structure described by IEntityMapping (2503) of FIG. 9, line (623) is an example of a structure described by IEntityPartMapping (2507) of FIG. 9, line (624) is an example of a structure described by IMappingConstraint (2501) of FIG. 9, line (625) is an example of a structure described by IPropertyMeta (2301) of FIG. 8, line (626) is an example of a structure described by IRelationMeta (2302) of FIG. 8, line (627) is an example of a structure described by IEntityMapping (2503) of FIG. 9, line (628) and line (629) are examples of a structure described by IEntityPartMapping (2507) of FIG. 9. The indention between the lines (627), (628), and (629) indicate three levels of hierarchical nesting as an example of the hierarchical recursive structure of mapping specification (2103) illustrated in FIG. 10.

The ORM tool implements nine distinct mapping capabilities based on the structure of the mapping specification and the abstraction of the domain model and data models described above:

1. Subsetting exposes a subset of a data entity's attributes as domain object properties.

2. Renaming exposes data entities and their attributes using different names.

3. Composition exposes one or more related data entities through a single domain object.

Capabilities 1, 2, and 3 are provided in object-relational mapping tools. In the present invention, the implementation of composition, the relational queries that compose one database entity with another are not supplied by the developer of the mapping specification. Instead, based on the structure of the mapping specification described above, the developer of the mapping specification defines a domain object mapping in terms of a "root" database entity (e.g., line (627) in the XML file (600)) and zero or more ancillary part entities (e.g., lines (628) and (629) in the XML file (600)). Part entities may in turn be composed of other subpart entities, in a recursive manner. The properties of a domain object map to attributes of the root entity or one of the ancillary part entities.

The queries to compose database entities are constructed automatically during code generation by analysis of the mapping specification (i.e., the relationship between the root and its parts, and parts and their subparts) and the underlying relational metamodel. A part is specified by its database type. In many cases, this is the only information the developer need provide in the specification for the code generator to determine the relational query that links entities in the database. Where there is more than one way to compose entities, the developer needs to name the database relationship with which to compose the entities. In order to establish recursive relationships, a developer specifies the directionality of the relationship. A recursive relationship is a relationship that links entities of the same type, such as one used to compose a part-whole hierarchy. Directionality specifies, between two entities, which entity is the parent and which entity is the child.

4. Hidden relationships allow one domain object to relate directly to another, while in the data model, the underlying data entities relate indirectly, through intermediate data entities that are not exposed in the data model. Hiding relationships is a form of composition (capability #3), but is well suited to hiding indirect relations that create one-to-many or many-to-many relationships. In this case, the part entity may be many-valued (typically, because it is related to the root or super part through a relation in which the subpart is the child). From each individual entity comprising the part, the mapping then follows a single-valued relation to a single entity, which is then inversely mapped to a domain object. The collection of such entities is a multi-valued relation in the domain model.

5. Hidden redundancy allows domain object to update a denormalized data model property or relation consistently. The mapping specification can contain any number of mappings for a domain property or relation; the code generator creates code to set each such mapping.

6. Defaulting provides values for properties of newly created domain objects. This capability supports creating domain objects that map to root entities or compose parts with mandatory attribute values, or which maintain a usage rule invariant.

7. Conditional attributes expose data entity attribute values through domain object properties when specified constraints are met; the property has null value if the constraints are not met.

8. Relation abstraction allows the implementation of a domain model relation to be insulated from the underlying implementation of a data model relation (e.g., direction or implementation technique). The mapping specification refers to relations that compose parts and subparts, or which are exposed as domain object relation values by name only. The code generator is responsible for creating queries to expose the relation value; the code that it generates is dependent upon the relation type (e.g., traditional foreign key join or proprietary techniques that support non-relational concepts), relation directionality, and cardinality. If the relation implementation changes in future versions of the database, the mapping specification, and the domain API exposed to programmers does not change.

9. Natural key semantics recognize that some domain object properties map onto data entity attributes controlled by unique-key constraints; such properties cannot be updated arbitrarily, but instead, must be treated as creating a reference to a different object (which itself must be created if nonexistent).

Figure 12:
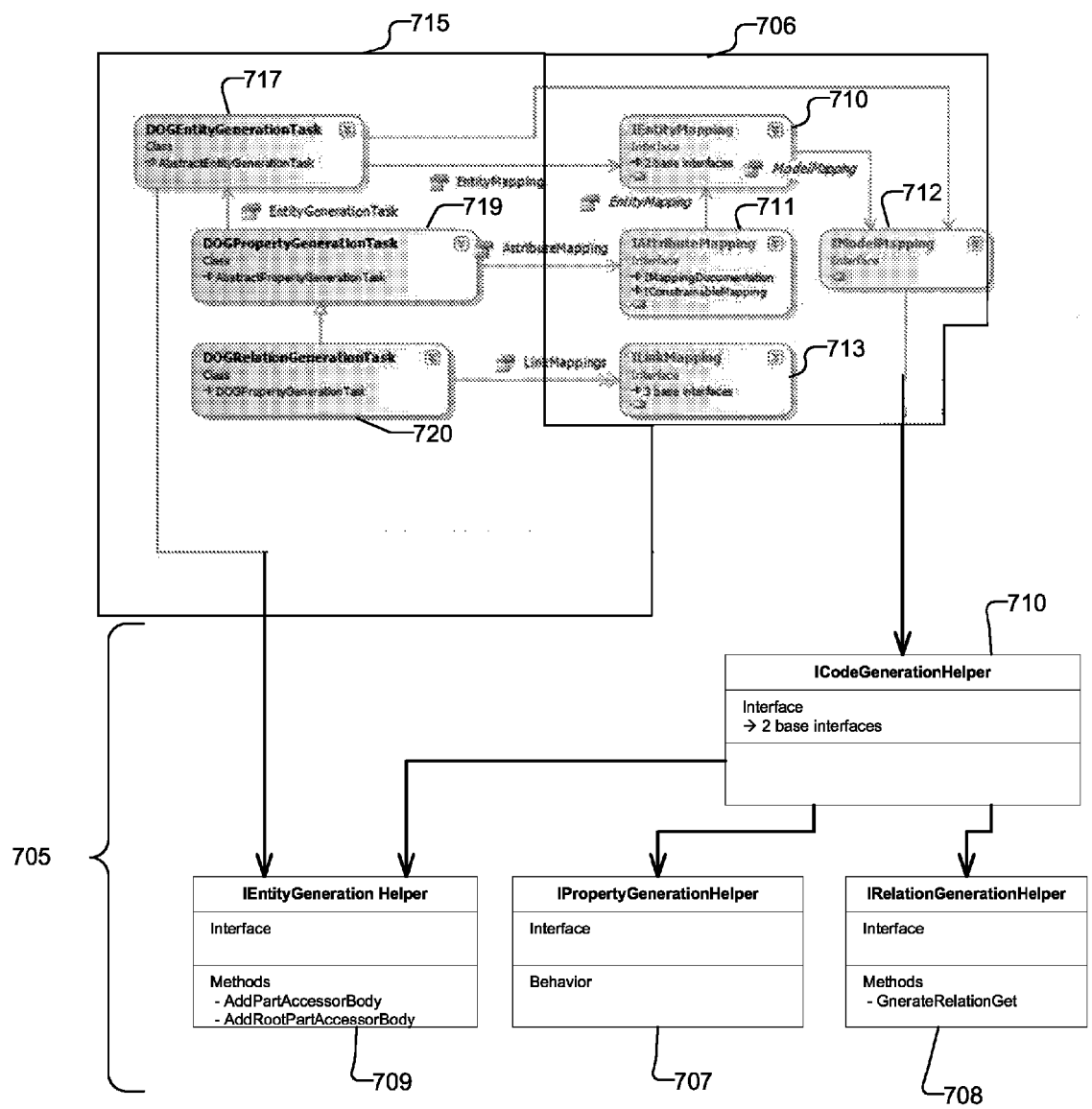
FIG. 12 shows structural generating classes, query generating classes and mapping specification classes in UML format.

FIG. 12 shows structural generating classes (715), query-generating classes (705) and mapping specification classes (706) in UML format. As shown in FIG. 12, the various tasks (717), (719), and (720) of the structural generating classes (715) are examples of the Model Mapping Code Generator Task (2215) of FIG. 7. The mapping specification classes (706) are an example of mapping specification (2103). The structure of domain objects is separable from implementation details that depend upon the type of the specific relational database to which the domain objects are being mapped. For example, domain objects may be defined in a hierarchy such that they expose information through readable (and usually writable) properties. This separability can be exploited in the code generation architecture. As shown in FIG. 12, structural generating classes (715) are configured to generate the structure of domain objects. Query generating classes 705 are responsible for generating code that queries the relational database. The structural generating classes (715) can be used with any of the query generating classes 705. The cooperation of these classes allows the implicit knowledge embedded in structural generating classes (715) to be reused with code generators for different relational databases. Similarly, the query generating classes 705 can be reused in multiple contexts. For example, the query generating classes 705 can be used to generate queries to navigate from object to objects. They can also be used to generate queries that find objects according to domain-level criteria as opposed to database-level criteria. In addition, the query generating classes 705 can be used to generate queries that preload domain object properties with database-level information.

As shown in FIG. 12, ICodeGenerationHelper (709) is an interface that identifies three additional interfaces: IEntityGenerationHelper (710), IPropertyGenerationHelper (707) and IRelationGenerationHelper (708). In one example, implementations of IEntityGenerationHelper (710) contain methods that the DOGEntityGenerationTask (717) uses to help to form the implementation of a domain type within the implementation of the domain API for a specific target database. In another example, implementations of IPropertyGenerationHelper (707) contain methods that DOGPropertyGenerationTask (719) uses to form the implementation of a property of a domain type within the implementation of the domain API for a specific target database. In yet another example, implementations of IRelationGenerationHelper (708) contain methods that DOGRelationGenerationTask (720) uses to form the implementation of a relation between one domain type and another domain type within the implementation of the domain API for a specific target database. The same DOGEntityGenerationTask (717), DOGPropertyGenerationTask (719), and DOGRelationGenerationTask (720) can be used to generate code that implements the domain API for different target databases by using different implementations of IEntityGenerationHelper (710), IPropertyGenerationHelper (707), and IRelationGenerationHelper (708).

Figure 13:
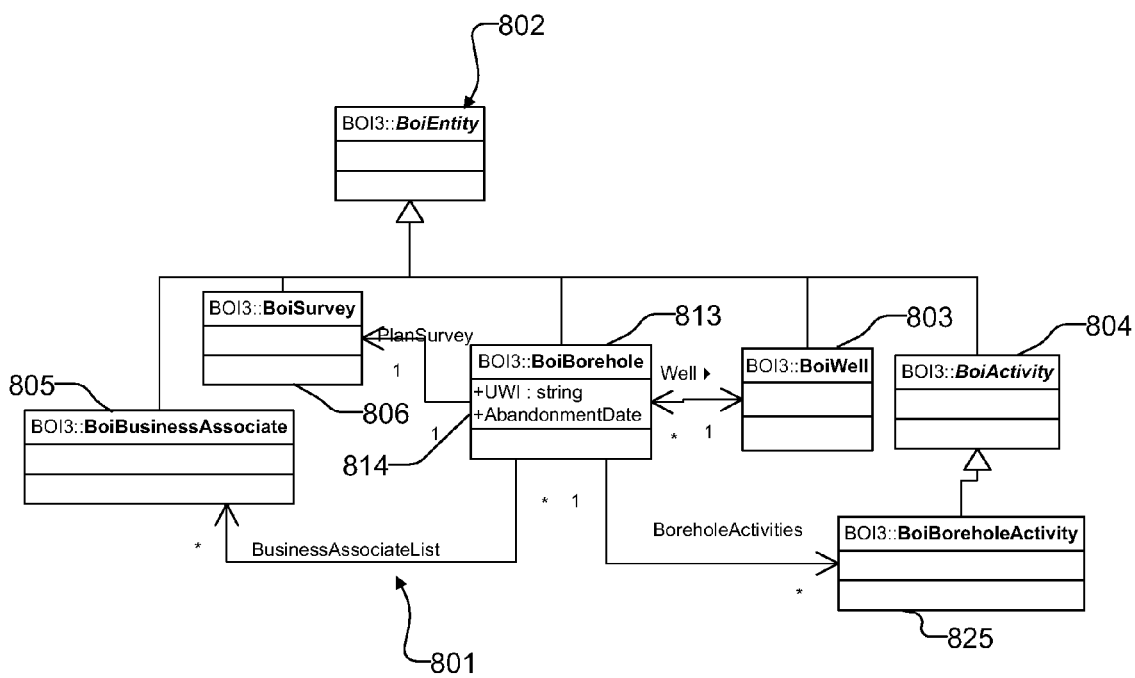
FIG. 13 shows a portion of an object-oriented application programming interface in UML format.
Figure 14:
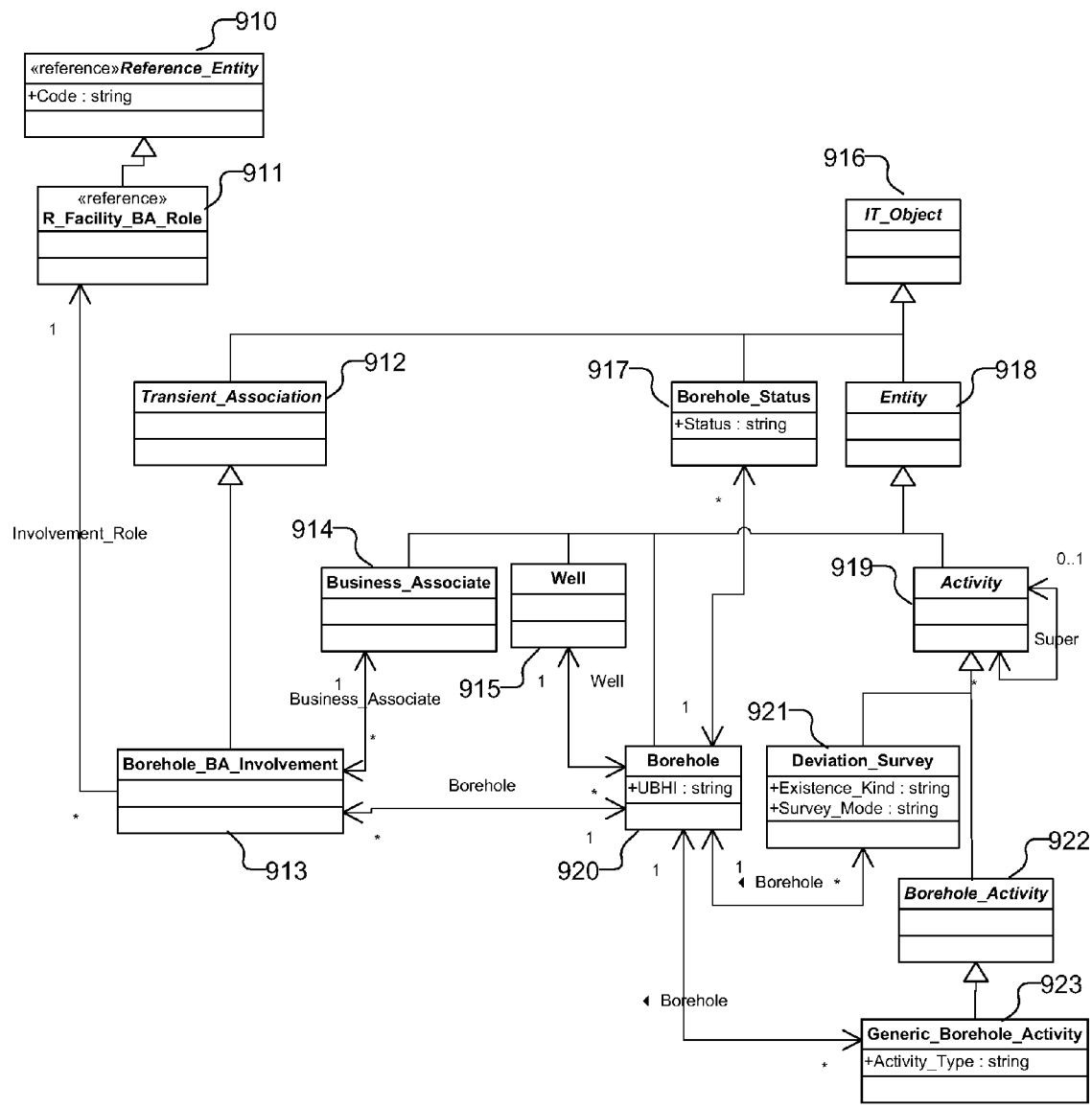
FIG. 14 shows a conceptual data model in UML format for a relational database.

FIG. 13 shows a portion of an object API for a domain, related to the domain metamodel and mapping specification of FIG. 11 and is depicted as a Unified Modeling Language (UML) static structure diagram for a "BOI" drilling domain model. FIG. 14 shows a portion of the Seabed conceptual data model for a relational database, containing data accessible as the object model using the object API in FIG. 13. The XML shown in FIG. 11 maps the domain model of FIG. 13 to the data model of FIG. 14.

Consider the UWI property (814) of the BoiBorehole domain object (813). Referring back to FIG. 1, the UWI property (614) maps to the UBHI attribute (615) of the Seabed Borehole entity portion (650) of the XML file (600). This is a straightforward mapping. The code for mapping the BoiBorehole domain object (813) is generated by the following process using tasks illustrated in FIG. 12.

1. The DOGEntityGenerationTask (717) of FIG. 12 creates the declaration of the BoiBorehole domain object:

```
public class BoiBorehole: BoiEntity {
}
```

2. Next, the DOGPropertyGenerationTask (719) adds the declaration of the UWI property:

```
public class BoiBorehole: BoiEntity {
    public String UWI { get; set; }
}
```

Finally, DOGPropertyGenerationTask (719) invokes the IPropertyGenerationHelper (707) implementation for the Seabed database to create the code to set and get the UWI property. There are many possible ways to implement these operations. Fundamentally, they involve a query to load the property and a query to save the updated property:

SELECT UBHI FROM Borehole WHERE Id=@p0

UPDATE Borehole SET UBHI=@p0 WHERE Borehole.Id=@p1

The tokens @p0 and @p1 represent parameters that allow the same queries to be executed multiple times referring to different boreholes or UBHI string values. The actual values to use in the query are provided externally to the parameters. A relational database may substitute the actual values into the actual query when it processes the query request.

Next, referring back to FIG. 13, consider the BusinessAssociateList (801) relation exposed by BoiBorehole (813). This is a significantly more complicated query, because it involves relation hiding and abstraction.

1. Once again, the DOGEntityGenerationTask (717) and DOGPropertyGenerationTask (719) objects of FIG. 12 are responsible for creating the BoiBorehole domain object declaration:

```
public class BoiBorehole: BoiEntity {
    public String UWI { get; set; }
    public IList<BoiBusinessAssociate> BusinessAssociateList
        { get; }
}
```

Note that the BusinessAssociateList (801) property is "get" only. This is because the DOGRelationGenerationHelper (708) recognizes that the relation is multi-valued. When the relation is multi-valued, application code may only get the value of the relation, but can subsequently add and remove from the returned collection.

2. The DOGRelationGenerationTask (717) asks the IRelationGenerationHelper (708) implementation for the Seabed database to supply code that queries the database to find the BBAI part of the BoiBorehole domain object. Referring to FIG. 11, BBAI (617) is defined as the set of Borehole_BA_Involvement (618) entities whose Involvement_Role (619) is the value "Project_Team" (620). Implicit in the relationship between the Borehole and the Borehole_BA_Involvement entities is the Borehole relation that links the Borehole_BA_Involvement to its Borehole. Thus, the query to find the set of Borehole_BA_Involvement entities that includes the BBAI part is:

SELECT Id FROM
Borehole_BA_Involvement
WHERE Borehole_Id=@p0
AND Involvement_Role=@p1

In this query, the parameter p1 is bound to the string "Project_Team." Passing the constraint value by parameter allows the relational database to reprocess the same query, with potentially different bindings for p1. More importantly, passing the constraint value by parameter prevents a "SQL Injection Attack." A SQL injection attack involves passing malformed strings to the relational query interface that causes the database server to damage or destroy critical data.

3. The DOGRelationGenerationTask (707) asks the IRelationGenerationHelper (708) implementation for Seabed to supply code that queries the database to find the set of Business_Associate entities associated with the BBAI part. The helper (708) generates code that executes this query:

SELECT Business_Associate.Id FROM
Business_Associate WHERE Id IN
(SELECT Borehole_BA_Involvement.Id FROM
Borehole_BA_Involvement
WHERE Borehole_BA_Involvement.Borehole_ Id=@p0
AND
Borehole_BA_Involvement.Involvement_Role=@p1)

This query nests the previous query as a subquery. It is also within the scope of the invention for the generated implementation to cache the Id values of the entities that comprise the BBAI part, and to supply those values in the query to find the Business_Associate entities:

SELECT Business_Associate.Id FROM
Business_Associate WHERE Id IN
(1234567, 34736205, 353294, 3134503, . . . , 1462084)

4. The DOGRelationGenerationTask (720) creates code to respond to add and remove events from the multi-valued collection. In response to a BoiBusinessAssociate being added to the list, the IRelationGenerationHelper (708) generates code that creates a new Borehole_BA_Involvement and relates it to the Borehole and the Business_Associate entities in the database. In response to removing a BoiBusinessAssociate from the list, it generates code that removes the appropriate Borehole_BA_Involvement from the database.

Also shown in FIG. 13, BOI3::BoiSurvey (806), BOI3::BoiBusinessAssociate (805), BOI3::BoiWell (803), and BOI3::BoiActivity (825) describe other types in the "BOI" drilling domain model.

FIG. 14 describes, in UML format, a portion of the Seabed relational metamodel centered upon the Borehole entity. The names in the boxes in this figure refer to entity names in the Seabed relational metamodel. This is an example of a relational metamodel of the type that may be mapped from the domain types of FIG. 13. As shown in FIG. 14, the lines between the boxes refer to relationships between entities (line with open arrowhead), or subtype relations between domain entities (line with triangular arrowheads). Subtype relations are implicit in a relational database, because relational metamodels are different from the object-oriented metamodels in that there is no concept of type inheritance. To the first order, while only concrete leaf nodes in a type hierarchy exist in a relational database (e.g., Generic_Borehole_Activity (923), Borehole (920), Deviation_Survey (921)), in Seabed, the concept of an abstract base class (such as Activity (919), Entity (918) or IT_Object (916)) manifests itself as common columns in tables whose types derive from the abstract type. For example, all columns defined for the abstract type Entity (918) exist in all tables whose type derives from Entity (918).

As shown in FIG. 14, the relational metamodel may include multiple Generic_Borehole_Activities (923), Deviation_Surveys (921), Borehole_BA_Involvement (913), and Borehole_Statuses (917) associated with one Borehole. Here BA stands for Business Associate (e.g., company, person, etc.) and Borehole_BA_Involvement (913) supports encoding a many-to-many relationship between boreholes and business associates.

A single well may be associated with multiple boreholes. A Deviation_Survey (921) and a Borehole_Activity (922) are subtypes of Activity (919). A Generic_Borehole_Activity (923) is a subtype of Borehole_Activity (922). A Business_Associate (914), Well (915), Borehole (920), and Activity (919) are all subtypes of Entity (918), which is a subtype of IT_Object (916).

Some of the links in FIG. 14 are labeled for clarity. For example, the link between Borehole (920) and Borehole_BA_ Involvement (913) is labeled "Borehole." This identifies the name of the relation in the Seabed metamodel that associates a Borehole_BA_Involvement (913) with a Borehole (920). There is a link from Activity (919) to itself called "Super." This means an activity can have zero or one parent activities, and is a concise way of illustrating that activities can form a tree hierarchy. The decoration "0 . . . 1" in FIG. 14 indicates zero or one objects.

Figure 15:
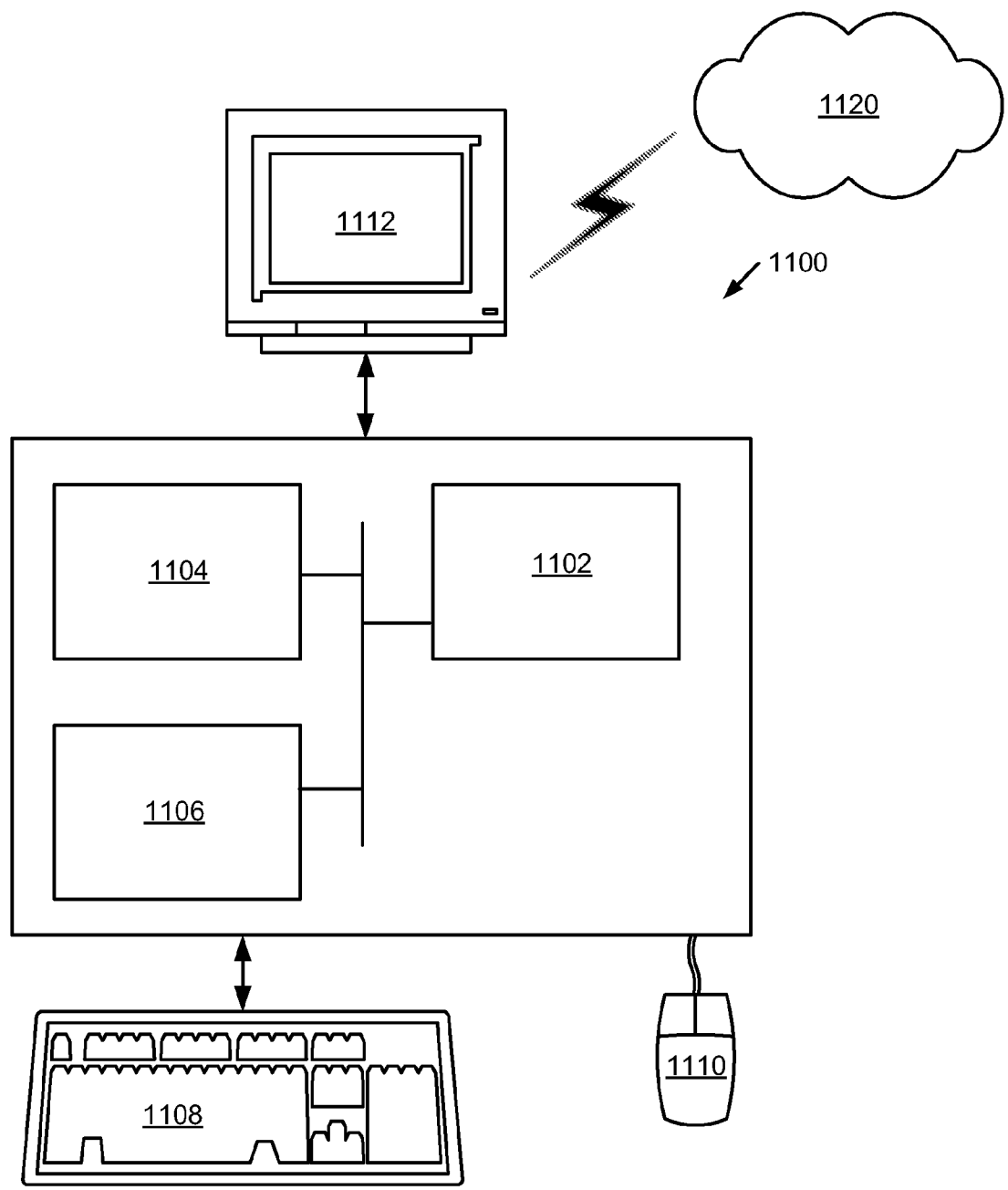
FIG. 15 shows a computer system.

The invention may be implemented on virtually any type of computer regardless of the platform being used. For example, as shown in FIG. 15, a computer system (1100) includes a processor (1102), associated memory (1104), a storage device (1106), and numerous other elements and functionalities typical of today's computers (not shown). The computer (1100) may also include input means, such as a keyboard (1108) and a mouse (1110), and output means, such as a monitor (1112). The computer system (1100) is connected to a local area network (LAN) or a wide area network (1120) (for example, the Internet) via a network interface connection or transceiver (not shown). A transceiver is a device that transmits data by a wired or wireless connection. Those skilled in the art will appreciate that these input and output means may take other forms.

Further, those skilled in the art will appreciate that one or more elements of the computer system (1100) may be located at a remote location and connected to the other elements over a network. Further, the invention may be implemented on a distributed system having a plurality of nodes, where each portion of the invention (for example, object store layer, communication layer, simulation logic layer, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform an embodiment of the invention may be stored on a computer readable medium such as a compact disc (CD), a diskette, a tape, a file, or any other computer readable storage device.

Figure 16:
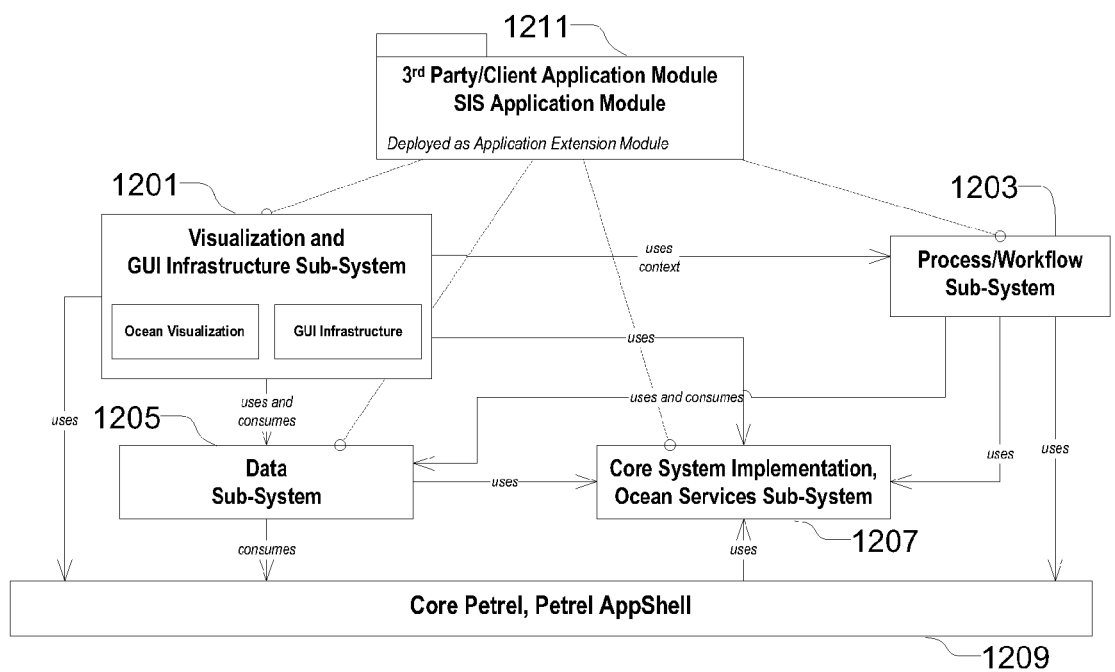
FIG. 16 shows a system architecture, which may be supported by domain objects of the invention.

FIG. 16 shows a system architecture, which may be supported by domain objects of the invention. Domain objects provide a convenient programming abstraction as compared to many of the data sources that Ocean programmers may encounter. In particular, domain objects hide much of the complexity associated with relational database operations. In the Ocean vision, domain objects also provide interoperability between product families: a domain object API must be compatible with all product families, even though the underlying data sources may be different from product family to product family.

Specifically, the architecture includes a visualization and graphical user interface infrastructure sub-system (1201), a process/workflow sub-system (1203), a data sub-system (1205), and a core system implementation and Ocean services sub-system (1207). In addition, such an architecture may support a product family (1209) including Schlumberger Information Solutions products, such as Core Petrel, and Petrel AppShell. Furthermore, a pluggable application module (1211) may connect to one or more subsystems. The pluggable application module (1211) may be made by a third party or by Schlumberger Information Solutions.

Figure 17:
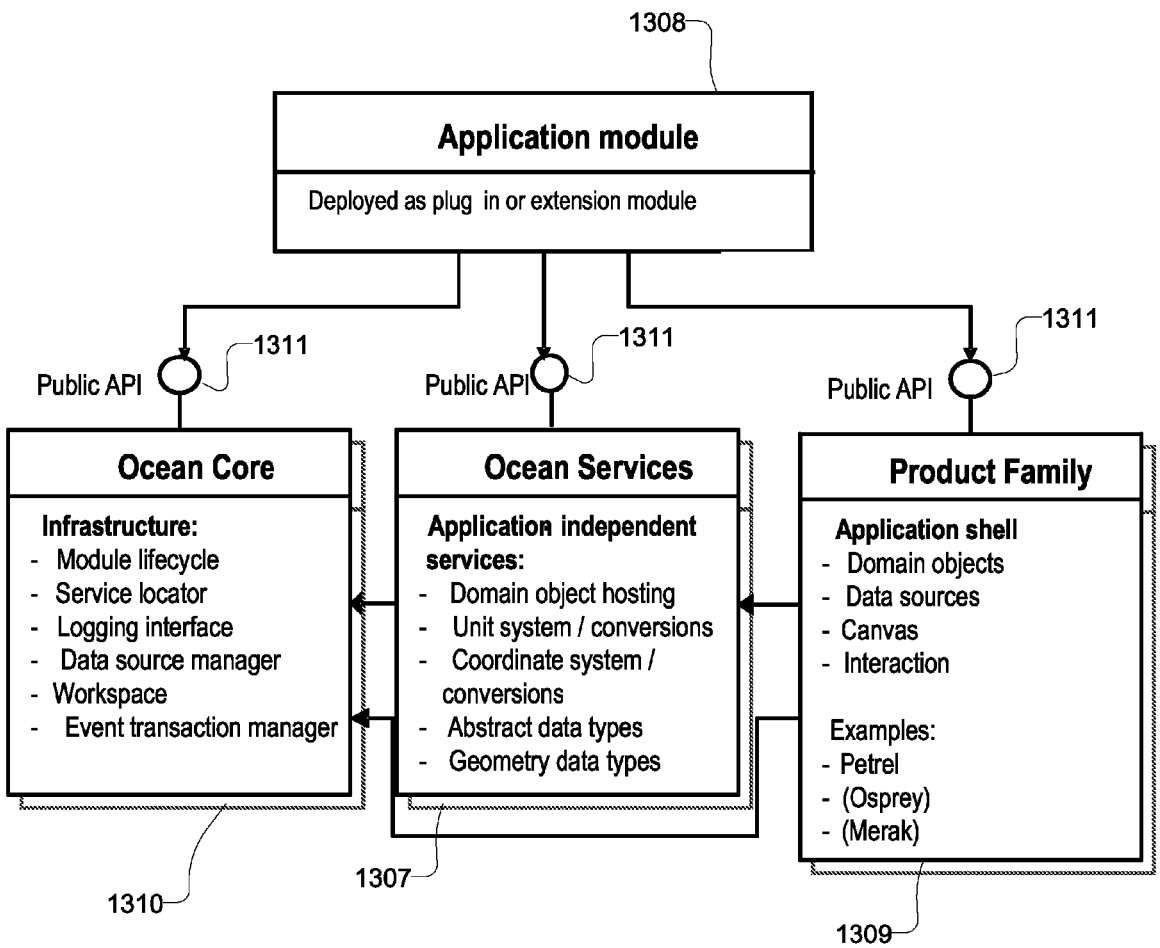
FIG. 17 shows a detailed example of functions performed by the system architecture.

FIG. 17 shows a detailed example of functions performed by, for example, the core system implementation and Ocean services sub-system (1307) and a product family (1309), as well as Ocean Core (1310). The Ocean core may include infrastructure functions of a module lifecycle, service locator, logging interface, data source manager, workspace, and an event transaction manager. The Ocean services may include application independent services, such as, for example, domain object hosting, unit system conversions, coordinate system conversions, abstract data types, and geometry data types. The product family may provide domain objects, data sources, among others.

Figure 18:
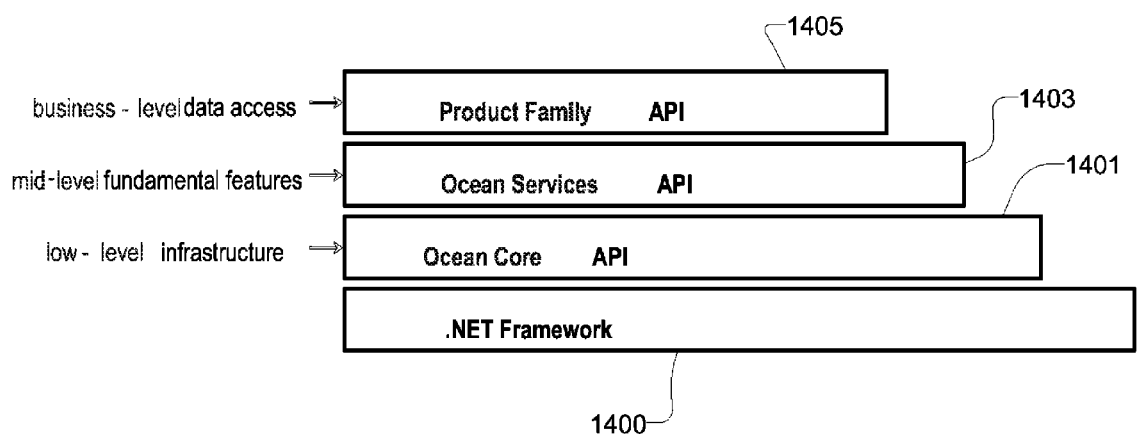
FIG. 18 shows the interrelationship of layers of functionality in the system architecture.

FIG. 18 shows the interrelationship of layers of functionality in the system architecture. The system architecture may be organized and dependent from a .NET (or any comparable) framework (1400). The Ocean core API (1401) may provide low-level infrastructure functionality. The Ocean services API (1403) may provide mid-level fundamental features, relying on functions of the Ocean core API (1401). The Product Family API may provide business-level data access (1405).

Figure 19:
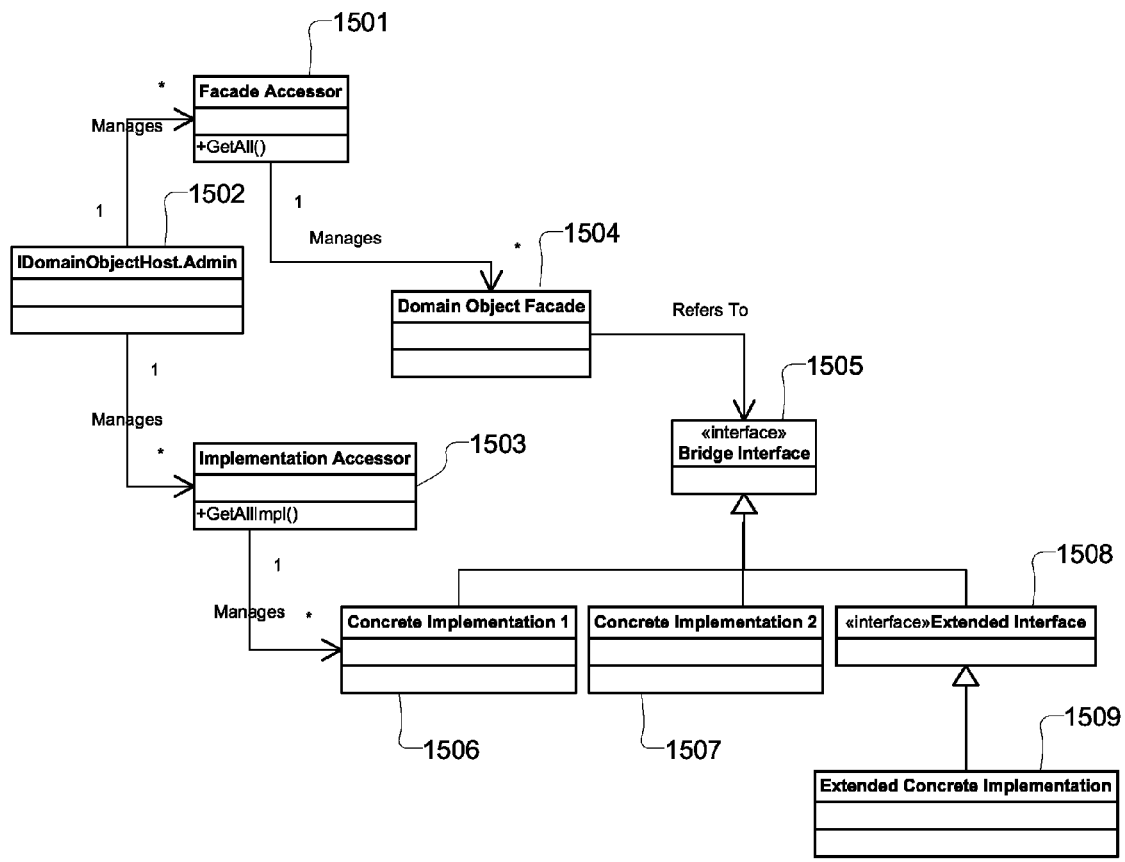
FIG. 19 shows a domain object implementation in UML format.

FIG. 19 shows a unified modeling language diagram of a domain object hosting service implementation. The domain object implementation extends a bridge pattern with the façade accessor (1501) and the implementation accessor (1503). Here, the façade accessor (1501), the domain object façade (1504), and the bridge interface (1505) form a interface layer of the Object API (2132) in FIG. 6. The concrete implementation 1 (1506), concrete implementation 2 (1507), extended interface (1508), and extended concrete implementation (1509) form an implementation layer of the Object API (2132) in FIG. 6. As described in FIG. 6, the interface layer of the Object API (2132) may be automatically generated by the code generator (2111) using the domain metamodel (2101). The implementation layer of the Object API (2132) may be automatically generated by the code generator (2111) using the domain metamodel (2101), the target relational metamodel (2105), the mapping specification (2103), and optionally the reference metamodel (2107).

Figure 20:
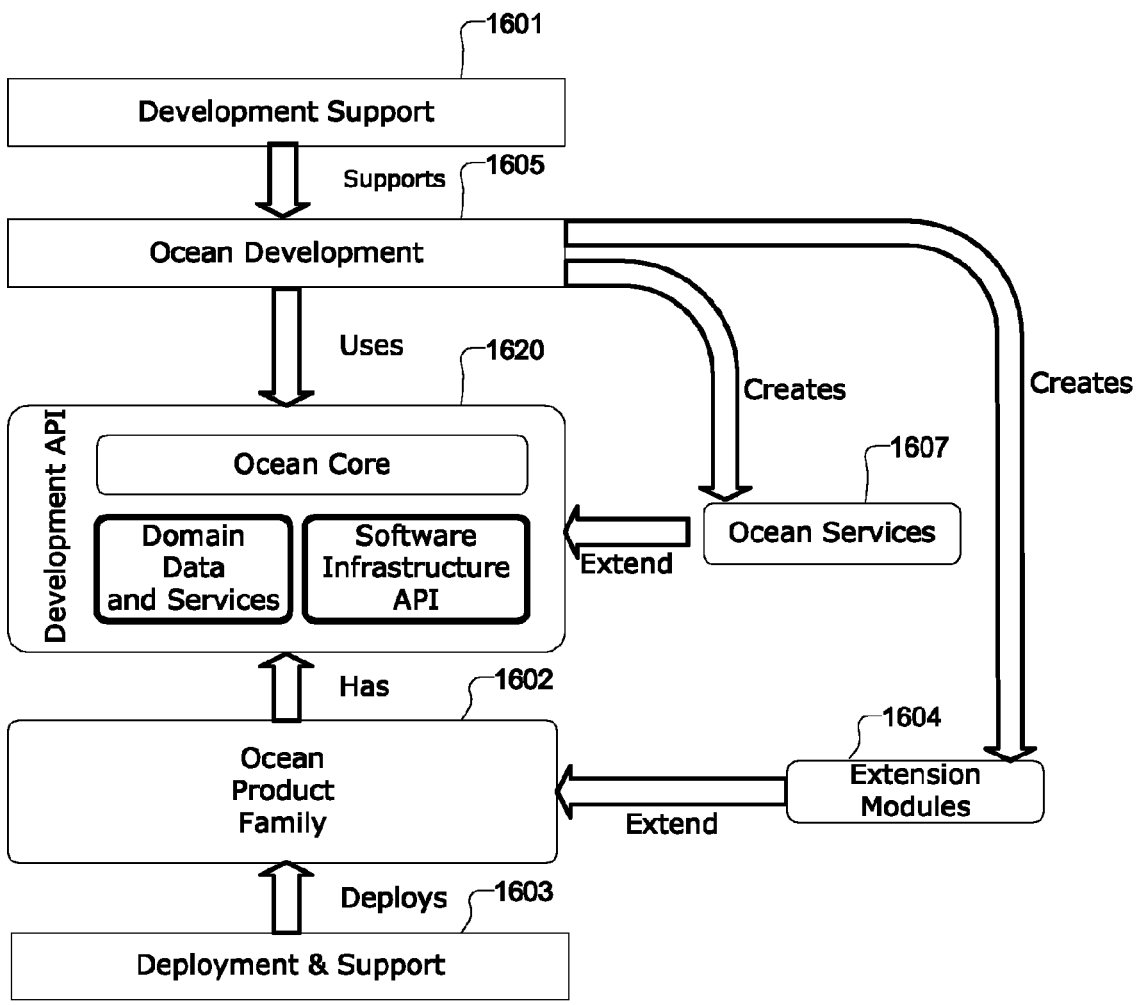
FIG. 20 shows an architecture for developing and deploying objects.

FIG. 20 shows an exemplary architecture for developing and deploying objects. A development platform (1605) permits developers to create services (1607), for example, services for the Ocean product family of Schlumberger Information Solutions. Domain object hosting may supply the needs of data-centric product families. Domain object hosting may be supported within the development API (1620). Here, Development Support (1601) refers to tools a programmer uses to develop an application, in this case, for the Ocean Framework (1605). An Ocean Product Family in the Framework (1605) uses the Ocean-based Development API (1620) to support a range of related applications (not shown). Deployment and Support (1603) refers to the business processes that must occur to deploy software using the Ocean Product Family (1605) on a computer.

Further, FIG. 20 provides context for understanding the relationship between domain object services and the broader Ocean program. Domain object services include a portion of the Data-Centric Software Infrastructure. Product family developers (or programmers), in turn, use domain object services to create domain data classes.

Domain object services help to deliver a productive development environment for all Ocean developers. Domain object services extend the Core's domain object hosting service, providing capabilities that are expected to fit the needs of the data-centric product families. These include:

- development, deployment, and runtime elements that support domain model development and mapping onto an open-ended variety of data stores,
- configurable services that help to enhance performance or assure correct program behavior, such as opportunistic caching of data store query results, transactional semantics, concurrency violation detection, exploitation of data-store-specific functionality, and conversion of measured quantity data to expected unit and/or coordinate systems, and
- portability of domain object APIs between product families and across multiple data stores.

Domain object services extend the Ocean Core's Domain Object Hosting (DOH) layer. Domain object services complement DOH. Ocean is establishing rules for domain object behavior (e.g., multithreading support, unit, and coordinate data exposure); domain objects must comply with these rules.

Domain object services may also be involved in the bridge between domain objects, which represent entity and attribute data in a data model, and bulk data, which represents open-ended streams of data associated with a variety of entities.

Product families may require domain APIs to access data from different data sources. These include commercial third-party databases as well as proprietary customer databases.

Some data-centric products may need to work with data exposed through a classic connections (as opposed to meta-driven API connections). Access to data exposed through an object model, instead of a relational model, has architectural significance for domain object services.

Figure 21:
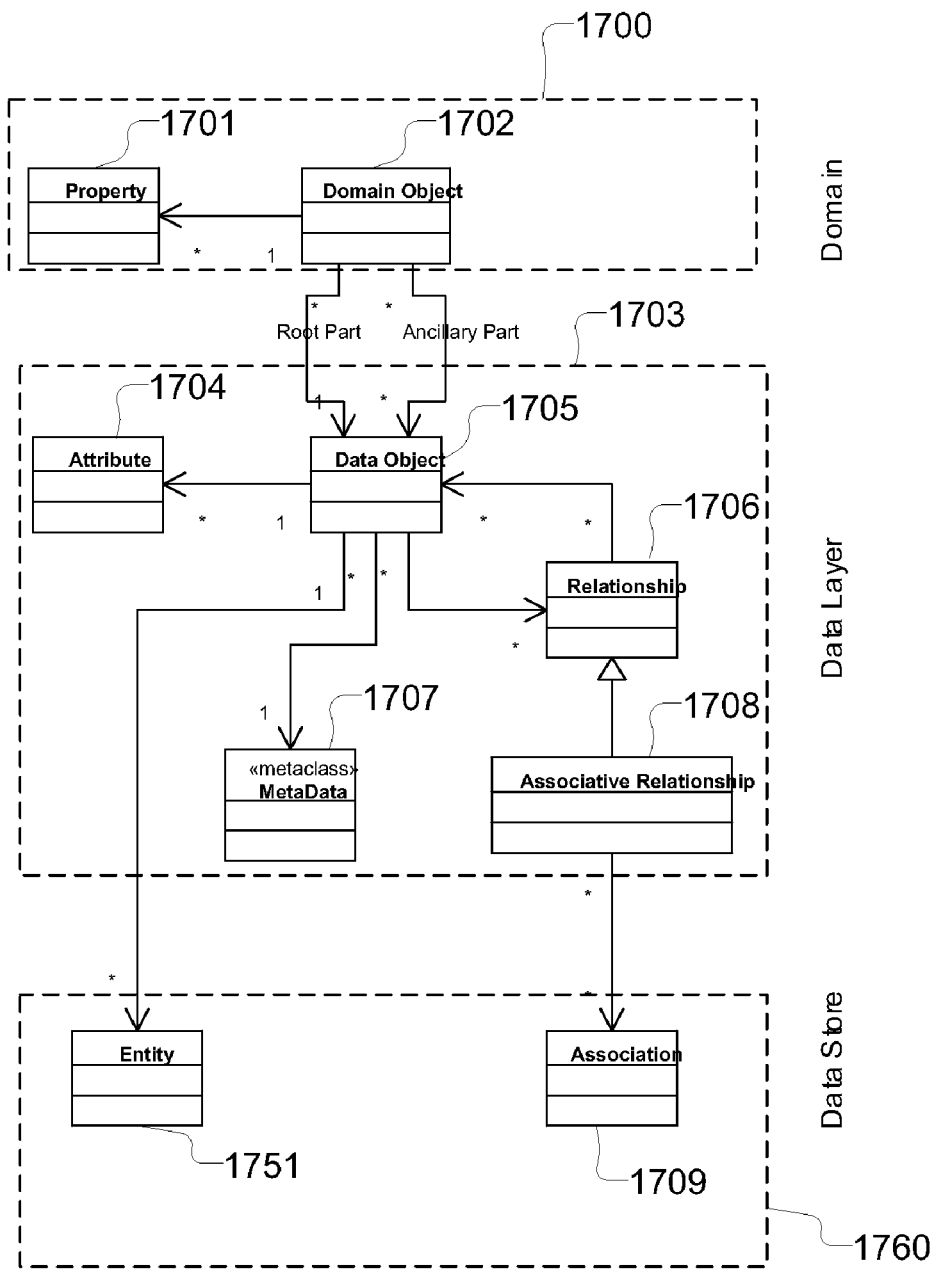
FIG. 21 shows dictionary cache objects within a data layer of a data dictionary accessor in UML format.

FIG. 21 shows dictionary cache objects within a data layer of a data dictionary accessor in UML format. FIG. 21 also shows an in-memory representation of the domain object. FIG. 21 supports queries to preload domain object properties (1701) within the domain object implementation (1700) with information from a complex web of interrelated database entities (1751). The entities (1751) may be derived from the table rows of the underlying data store (1760).

Figure 22A:
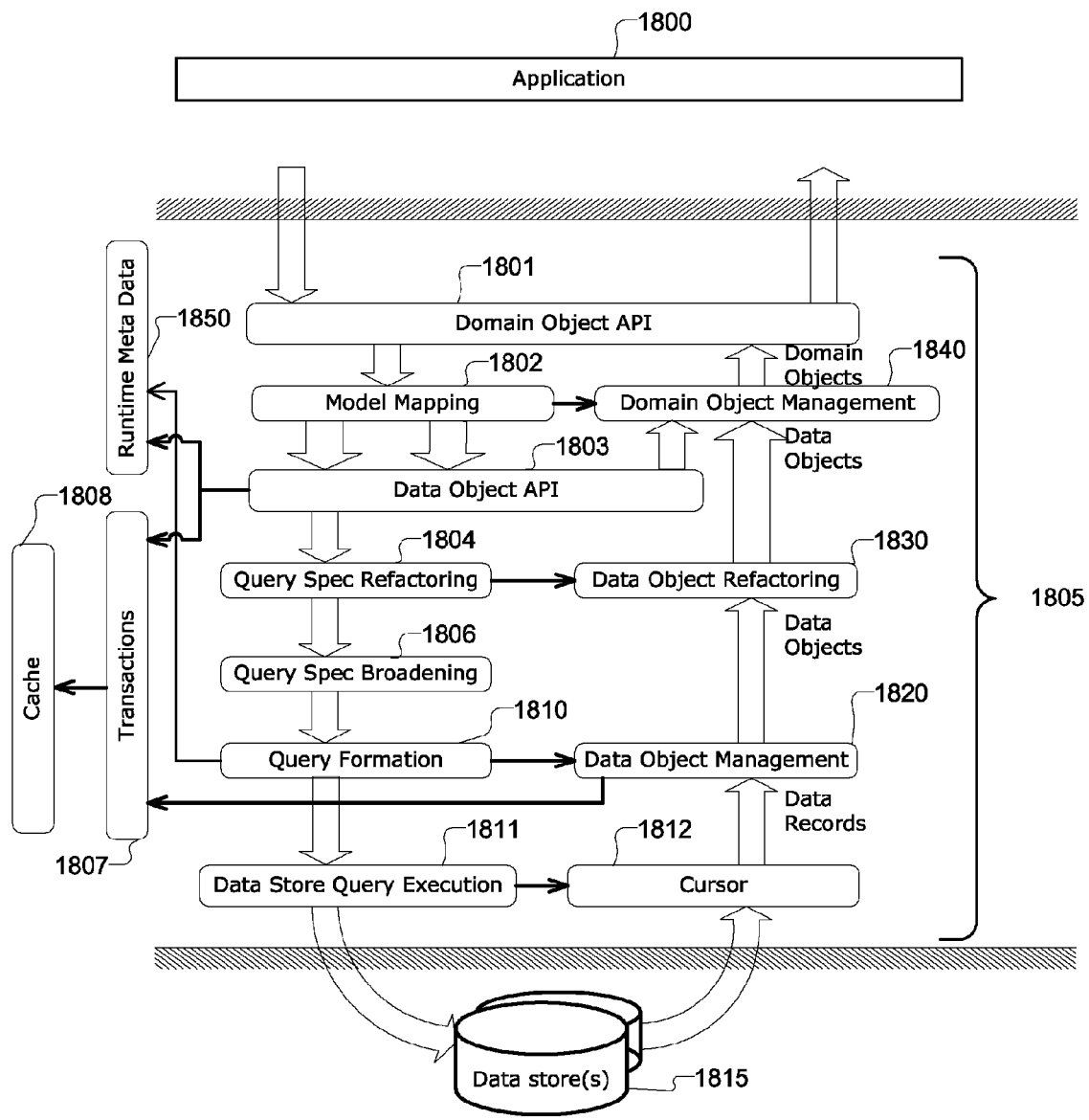
FIG. 22a shows a flow of queries and responses in accordance with an embodiment of the invention.

FIG. 22*a* shows a flow of queries and responses in accordance with an embodiment of the invention. Here, application (1800) refers to the application making use of the domain object API (1801). Data Store Query Execution (1811) refers to the process of executing a command in the data store (e.g., a SQL Database) (1815), the result of which is a Cursor (1812) that can be used to step through a result. Each time the cursor (1812) is stepped, a new query result is returned. The result is returned in the form of a data record, which is a dictionary of name/value pairs—the names are columns from the relational table and the values are the values of the corresponding columns for a single row. Each such result is converted to a Data Object (1705) of FIG. 21. Sometimes, a query returns a "joined result," in which the name/value pairs comprise columns and corresponding values from more than one table. The Data Object Refactoring (1830) creates separate Data Object instances from these values, such that each Data Object contains columns from a single table.

As shown in FIG. 22*a*, a domain object from application (1800) may present a query (1821) at the domain object API (1801). Domain object services may then be performed. Prior to presenting the query (1821) to the data store (1815), a query (1821) may be revised by refactoring (1804), broadening (1806), and through query formation (1810). The query formation module (1810) may convert a query (1821) to a format native to the data store (1815).

Next, a data object management module (1820) may convert results from queries into data objects. The data object management module (1820) may rely upon cached data objects for data, and update such cached data objects. Next, a data object refactoring module (1830) may aggregate multiple data objects into a single data object. Alternatively, the data object re-factoring module (1830) may convert a data object into separate data objects, each of which can be shared between multiple domain objects. The unseparated data object may have been created because of a join into separate data objects. In addition, the data object re-factoring module (1830) may rename attributes. Such data objects are passed to the domain object management module (1840).

Data object management module (1840) may map data objects to domain objects according to mapping specifications. Mapping specifications may be, for example, mapping specification (2103) of FIG. 6.

Runtime metadata (1850) provides a machine-interpretable description of a data model schema. This meta data is used for a number of tasks. This metadata is used for a number of tasks, such as enumerating the entity types in a data model, enumerating the attributes of an entity, identifying the type and constraints that apply to an attribute, and identifying the relations in which entities may participate.

Further, FIG. 22*a* shows the architecturally significant design packages that include domain object services. The runtime domain object services package may be compared to a pipeline; operations on the domain model (e.g., create, read, update, delete) enter at the top of the pipeline, and "flow" down to the data store level, being modified by stages in the pipeline. Results flow back up the pipeline, ultimately exiting at the top in the appropriate form (as domain objects or as status indications). Responsibility and collaboration information for each package follows.

Optional elements can be configured into the pipeline according to the demands of the application. This configuration can be specified globally, but can be overridden on a per-domain-object-type basis. In the component collaboration discussion that follows, components are marked as mandatory or optional; however, collaborations are discussed as if each possible component is configured. One skilled in the art should understand that if a collaborator component is not be configured into the pipeline, then the specific component being discussed collaborates with the next component in the pipeline instead. Also, in the discussion that follows, for each component of the pipeline, the "Responsibility" section describe the function of the component, the "Rationale" section describes the purpose of the function, and the "Collaborators" section describes other components that collaborate with this component in performing the function. It is noted that collaborations with other components in the pipeline are only described where needed.

| Domain Object API (Mandatory) (1801) | | |
|---|---|---|
| Responsibility | The domain object query service implements create, read, update, and delete operations on domain objects. | |
| Rationale | Encapsulate significant complexity of domain-to-data-model mapping, cache management, in-memory query, and query optimization. | |
| Collaborators | Model mapping (1802) | Passes domain object queries to the model mapping stage to be translated into data model query specifications. |
| | Domain Object Management (1840) | Receives domain object instances from the domain object management stage and returns them to the caller. |
| | Data object query service | Receives an enumerable object indirectly from the data object query service, in the case that a query can be satisfied by the in-memory cache. Calls the data object query service back to step the enumerator to retrieve data objects. |

| Model Mapping (mandatory) (1802) | | |
|---|---|---|
| Responsibility | Manages the mapping between domain objects and their properties to data objects and their attributes. Converts CRUD operations posed with respect to a domain model into CRUD operations relative to a data model. This is a key service required to map from domain object models to data bases. | |
| Rationale | Ocean's vision of sharable components encourages developers to create small, for-purpose domain models that can be adapted to work with one or more data stores. | |
| Collaborators | Domain object query service | Enumerable objects returned from data store queries are passed back to the calling program through the domain object query service. |
| | Data object query service | Model mapping calls upon the data object query service to perform CRUD operations on the data entities underlying data objects. Model mapping also receives an enumerable object from this service, which it passes back to the domain object query service. |
| | Domain Object Management (1840) | Model mapping provides context to domain object management, so that domain objects can be created for data objects, and domain object properties can be populated from data object attributes. |

| Data Object API (1803) | | |
|---|---|---|
| Responsibility | Optimize performance by providing an in-memory data cache that can satisfy certain queries without calling upon the persistent data store. If a query cannot be satisfied by the data object query service, it is passed onto the next stage in the pipeline. If the incoming operation from model mapping is a create, update, or delete operation, it is passed onto the transaction state management service. | |
| Rationale | Analysis of data access behavior indicates that a substantial number of database queries generated by the workspace are unnecessary, because the data required satisfying these queries is already in cache. | |

-continued

| Data Object API (1803) | | |
|---|---|---|
| Collaborators | Query Spec Refactoring (1804) | This optional stage is capable of combining multiple queries into a single query, or partitioning a single query (a join, for instance) into multiple queries, as a means for opportunistically caching data. |
| | Runtime meta data (1850) | Runtime meta data describes the schema of the data model in the persistent data store. This is used by the data object query service to properly format queries and to process query results. It is also used to identify relations between entities, so that placeholder data objects can be created to allow data integrity constraints to be maintained efficiently. |
| | Transaction state management (1807) | Create, update, and delete operations are passed onto the transaction state management service. Attribute value requests are also passed onto the transaction service, so that values are returned to calling programs consistent with the current transaction. |
| | Domain object management (1840) | Data objects resident in the in-memory cache are passed onto domain object management, so that corresponding domain object instances can be returned to calling programs. |

| Query Spec Refractoring (optional) (1804) | | |
|---|---|---|
| Responsibility | This optional stage is capable of combining multiple queries into a single query, or partitioning a single query (a join, for instance) into multiple queries, as a means for opportunistically caching data. | |
| Rationale | There is no strong rationale for this pipeline element, except hold open the possibility that totally unforeseen sorts of elements may be configured into the data access pipeline. | |
| Collaborators | Query spec broadening (1804) | Passes potentially modified query requests onto the query spec broadening, to take advantage of opportunistic caching possibilities. |
| | Data object refactoring (1830) | Combines or splits data objects, to make the effect of query spec refactoring invisible to upper level stages in the data access pipeline. |

| Query Spec Broadening (optional) (1806) | | |
|---|---|---|
| Responsibility | This element generalizes incoming queries by adding additional attributes to be retrieved or by relaxing query constraints so as to cause a larger result set to be retrieved. This stage implements an opportunistic caching policy that may be beneficial for certain applications that are willing to devote additional memory to cache in exchange for potentially fewer data store hits. | |
| Rationale | Amortizing the cost of data store hits over larger result sets can effectively reduce the total time spent waiting for data to be returned from the data store. | |
| Collaborators | Query formation | Passes query specifications to the query formation element, which ultimately accesses the data store. |

| Query Formation (mandatory) (1810) | | |
|---|---|---|
| Responsibility | This element accepts query (and other data store operation) specifications, and converts them to the native format of the data store. For a relational data store, this would typically be an SQL statement, whereas for an XML file, this might be an XPath query statement. | |
| Rationale | Native query generation should be delayed until after all pipeline stages have had a chance to modify the specifics of the query. | |
| Collaborators | Data store query execution (1811) | This element is responsible for executing the query or data store modification operations. |
| | Data object management (1820) | Data object management creates data objects that correspond to entities returned by queries. If necessary, query formation provides context to data object management to aid in this process. |

| Data Object Management (mandatory) (1820) | | |
|---|---|---|
| Responsibility | This element is responsible for converting results from queries into data objects. For each row returned by a query, a corresponding data object is returned up the pipeline, being created if necessary. If a data object already exists in cache, this element finds it, and updates any cached attributes from attributes returned by the query. | |
| Rationale | Data objects are the common in-memory representation for data store entities in Puffin; data store results should be converted to data objects as soon as possible. | |
| Collaborators | Data object refactoring (1830) | Data objects returned up the pipeline by data object management may be aggregated into fewer objects or split into more objects. |
| | Runtime meta data (1850) | Runtime meta data provides the means for the data object manager to create placeholder objects for inverse relations. |

| Data Object Refactoring (optional) (1830) | | |
|---|---|---|
| Responsibility | This element is responsible for aggregating multiple data objects into one (i.e., performing an in-memory join), or for converting a data object created as a result of a join into separate data objects, each of which can be shared between multiple domain objects. Part of this process may involve renaming attributes. | |
| Rationale | For a variety of reasons, queries to a data store might be made with a different level of granularity than is required by code that maps between data and domain models. This and the query spec refactoring element make it possible to change the level of granularity between the data object query service and the data store. | |
| Collaborators | Domain object management (1840) | Re-factored data objects are passed up the pipeline to domain object management, which creates domain object instances that correspond to data objects. |
| | Query Spec Refactoring (1804) | Query spec re-factoring provides the context needed to aggregate multiple data objects or to split individual data objects. |

| Domain Object Management (mandatory) (1840) | | |
|---|---|---|
| Responsibility | Data objects map to domain objects according to a mapping specification. Each domain object corresponds to exactly one "root" data object. As data objects flow up the pipeline, corresponding domain objects are found in the domain object cache, being created if necessary, and their properties are populated as required. | |
| Rationale | This element fits into domain object hosting architecture. There must be one element responsible for mapping between data and domain objects, to prevent multiple domain objects of the same type being created for a root data object. There must be at most one instance of a domain object of a given type that maps onto a given data entity. | |
| Collaborators | Model mapping (1802) | Model mapping provides the necessary context to choose the appropriate domain object type to create or return for a data object. |
| | Domain object query service | Domain objects found in cache or created by domain object management are passed up the pipeline to the domain object query service, to be returned to the calling program. |

| Transaction State Management (mandatory) (1847) | | |
|---|---|---|
| Responsibility | The transaction state management component holds uncommitted state for a transaction. It provides "read uncommitted" isolation for multiple threads accessing data in the in-memory data object cache. It provides the means for application code to change data atomically and to abandon a collection of changes without committing any to the data store. Transaction management must be flexibly implemented | |
| Rationale | Ocean software infrastructures are intended to be multithreaded. Transactional support is a good idea for multithreaded applications. Osprey's intent to use the staging area to hold a transaction is a novel idea that bridges the age-old traditional divide between applications that continually persist their data to a database and applications that require users to explicitly save their state. | |
| Collaborators | Cache management (1808) | Committed state is stored in data objects managed by the cache. |
| | Data object query service | Create, update, and delete operations are passed from the data object query service to the transaction service, where they are held until the transaction is committed. |
| | Query formation | When (outer) transactions are committed, uncommitted state in the transaction is persisted to the data store through (for example) SQL commands. |

| Cache Management (optional) (1808) | |
|---|---|
| Responsibility | Cache management provides an in-memory searchable cache of entities loaded from a data store. The cache can be queried through an API that has the expressive power of a subset of SQL sufficient to find entities constrained by type and predicates on attribute values. The search API supports a basic "inner join" capability. The cache allows both actual and derived attribute data to be associated with data objects. (Derived attributes are used chiefly to represent inverse relations.) |

-continued

| Cache Management (optional) (1808) | | |
|---|---|---|
| Rationale | The cache is optional. Applications that cannot afford the extra memory requirements for supporting a data cache, and that are willing to trade smaller memory footprints for increased data access overhead can run without the cache. Avoiding calls to the persistent data store through optimistic caching is a well-understood mechanism for obtaining good performance from a data-centric application. | |
| Collaborators | Transaction management (1807) | Requests for data objects not found in the state of a transaction fall through to the cache. |
| | Data object management (1820) | The cache provides data objects corresponding to data entities returned in query results, and holds new data objects created for data entities not found in the cache. |

| Runtime meta data (mandatory) (1850) | | |
|---|---|---|
| Responsibility | Runtime meta data provides a machine-interpretable description of a data model schema. This meta data is used for a number of tasks, such as enumerating the entity types in a data model, enumerating the attributes of an entity, identifying the type and constraints that apply to an attribute, and identifying the relations in which entities may participate. | |
| Rationale | A runtime meta description of data is mandatory for an in-memory data cache. Identifying relations between entities is mandatory for properly maintaining integrity in a network of data objects. | |
| Collaborators | Data object query service | Runtime meta data provides the means for data object queries to properly type retrieved attributes. |
| | Data object management (1820) | Runtime meta data provides the means for the data object manager to create placeholder objects for inverse relations. |

FIGS. 22b-22d show exemplary domain-level query.

FIG. 22b illustrates an application performing queries for data using domain-level query instead of query at the database level. The domain-level query uses the vocabulary of the domain model such as the domain types, their object-oriented type hierarchy, and the properties exposed by the types.

As shown in FIG. 22b, the application finds all BoiActualOperationDataPoint objects that reflect a drilling rig in the "Test" state by creating a QueryCriteria object for BoiActualOperationDataPoint. Each type in the domain model defines a nested type called QueryCriteria. The properties of the QueryCriteria object correspond directly to the properties of the associated domain model type. For example, BoiActualOperationDataPoint has a RigState property, which holds a string value. The corresponding QueryCriteria object also has a RigState property, but the value of QueryCriteria.RigState is a QueryConstraint, which allows the application to support a value and a comparison operator. This is useful, for example, to find all boreholes with a bottom depth greater than 2000 m, or all BoiActualOperationDataPoint objects with a RigState whose name begins with "T." The QueryCriteria object is automatically generated by the code generator, by examining the properties of the corresponding domain model type in the domain metamodel. The significance is that queries are the same regardless of the underlying relational metamodel that are ultimately being queried. This insulates application code from changes in the underlying database.

As shown in FIG. 22b, this simple case of finding a value using an exact string match, the QueryConstraint type assigns a simple string value, and converts the string value to a QueryConstraint object using an exact match comparison operator and the given string value. The application hands the completed QueryCriteria object to the façade accessor for BoiActualOperationDataPoint. Accessors are a type generated to perform bookkeeping over objects in the domain. Every domain object has a corresponding accessor type, which is used to create new objects, delete existing objects, perform queries for objects, and to raise notification events upon object creation, deletion and change. More details can be found in FIG. 19.

All of the above steps are performed in the Domain Object API (1801) of FIG. 22a.

In addition to what is shown in FIG. 22b the façade accessor finds the appropriate "implementation accessor" for the domain type in the specific data source being queried. The implementation accessor analyzes the QueryCriteria object and generates a query that corresponds to what the application wanted at the domain level, but in the terms of the relational data model associated with the specific data source being queried. This happens in the Model Mapping (1802) of FIG. 22a. The query is pushed down into the data access stack in the rest of the U-shaped figure of FIG. 22a. Results from the query are pushed back up to the Domain Object Management (1840), where implementation objects are materialized for the resulting table rows found by the query, and then façade objects are materialized for the implementation objects.

FIG. 22c shows a relevant portion of a relational metamodel to which the domain metamodel is mapped. BoiActualOperationDataPoint in FIG. 22b corresponds to Drilling_Operation_Data (1904) in FIG. 22b. Following the relations in the model, the relational metamodel may be traversed from Drilling_Operation_Data (1904) through Generic_Borehole_Activity (1905) to Deviation_Survey (1907). The query created on FIG. 22b turns into a relational query that finds all Drilling_Operation_Data (1904) associated indirectly with Deviation_Survey entities (1907) whose Activity_State property is set to "Test" in this case.

It can be seen in FIG. 22c that the "Super" relationship between Generic_Borehole_Activity (1905) and Deviation_Survey (1907) is a so-called "Assoc-type" relation, which is implemented through a relational view onto a special table. This is because the Super relation needs to encode semantics that cannot be directly encoded by relational database technology: it is many-to-many and it is abstract. As a result, each instance of the Super relation is held in a table row in a view called (in this case) Deviation_Survey_Ref, which points at both the source and target of the relation and identifies the types of relational entities involved in the relation instance. It is evident from the above description that the query created at the domain level in FIG. 22b is complex when expressed at the data level.

FIG. 22d shows the actual SQL query generated for the domain level query of FIG. 22b. Some of the query constraints are passed by parameter, for security. "@p0" is "Test", which comes from the domain level query itself. "@p1" is something like "Actual". It never changes and is determined by the specific mapping from the domain to the relational model. Similarly, "@p2" is "Super" because this is the name of the relation.

The code necessary to convert the domain query to the relational query is automatically generated by the domain object generator, using information in the mapping specification, the domain metamodel and the relational metamodel.

The steps in FIG. 22b and FIG. 22c are performed in the model mapping (1802) of FIG. 22a.

FIGS. 22e-22f show exemplary property priming.

For better performance, the application provides the data access stack with information regarding properties of domain object that the application may access. It is usually just as fast to load multiple columns from a relational database as it is to load a single column. For example, the data may be preloaded rather than hitting the database for every domain object as it is used. This process is called "priming." FIG. 22e illustrates the application finding all boreholes in the data source, and then asking the stack to prime the TopDepth and UWI properties of that collection of objects. This is performed in the Domain Object API (1801) of FIG. 22a.

FIG. 22f shows what has to be executed at the relational level to satisfy this request. TopDepth comes from the Position that is the Surface_Location the well associated with each borehole. UWI comes from the UBHI property of the borehole itself. The rest of the columns are fetched based on the need to know about entities that are pointed to by entities that are loaded, which is a general practice for more efficient integrity management in memory.

FIGS. 22g-22h show exemplary generated code structures.

Figure 23:
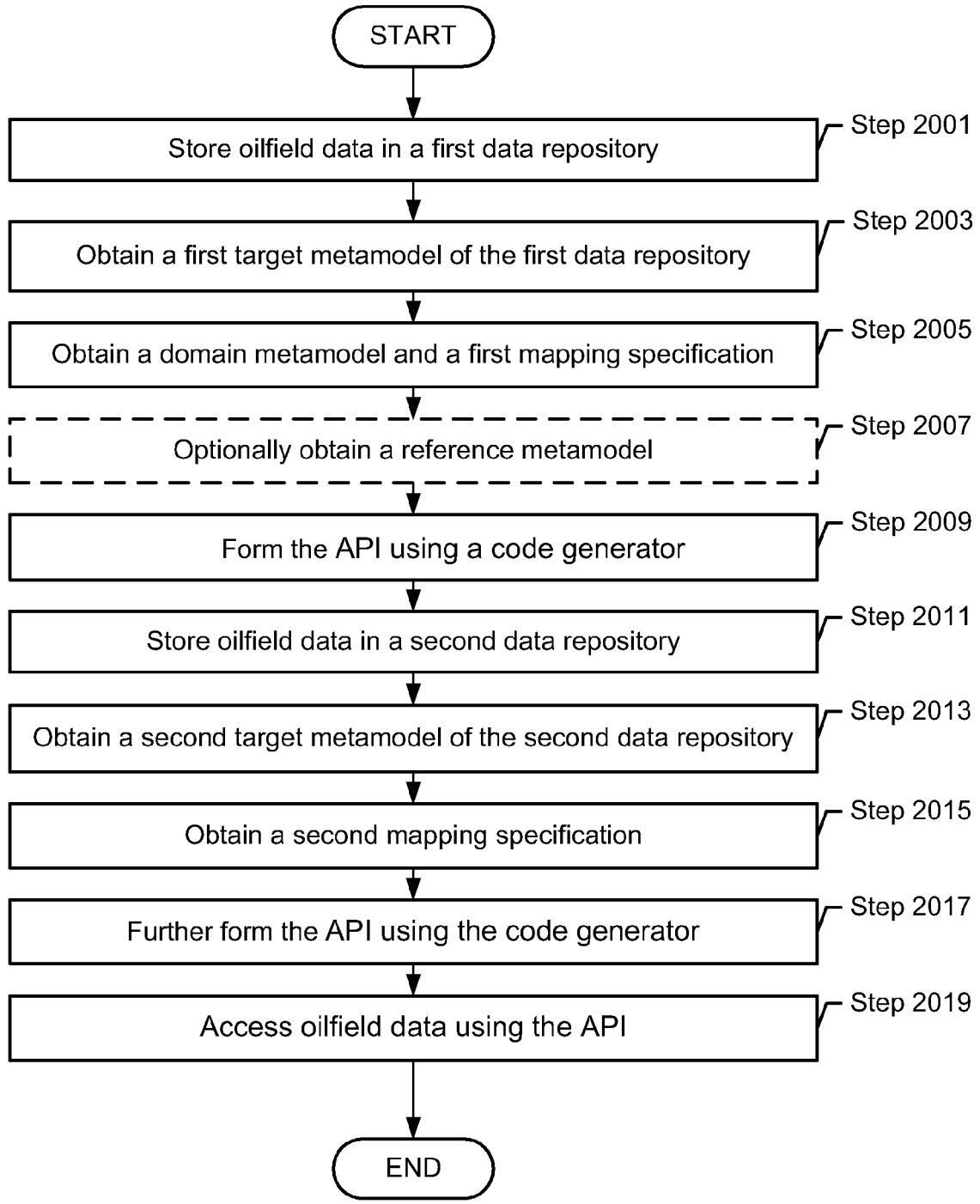
FIG. 23 shows a flow chart of a method for performing oilfield operation, such as the oilfield of FIG. 1.

FIG. 23 shows a flow chart of a method for performing oilfield operation, such as the oilfield of FIG. 1. In general, in one aspect, the method of the invention provides mapping between transient domain models of object oriented application programming interface to persistent data models of relational database. The method supports new and pre-existing domain models and automatically generates code including domain object façade classes and accessors, bridge interface, and implementation classes and accessors. The method hides relational data projection such that the tables, columns, relational keys, integrity constraints, queries of the relational database are not visible to the domain model users and the data model idiosyncrasy seepage to the domain model API is minimized. The method also scopes large data models by exposing a focused subset of a data model and allows multiple domain models to coexist and share underlying data. The method preserves relational data access efficiency by employing domain-level query, explicit domain-level priming, opportunistic caching, and opportunistic concurrency. The method simplifies mapping specifications by borrowing defaults from reference data model, performing extensive mapping validation, and support in-parallel and hand-written coding workflows where needed, including data type conversion and additional data-store-dependent behaviors. The approach of the method includes but is not limited to the following: one domain object maps to one or more table rows, one table row may correspond to more than one object, object properties map to table columns, object relations traverse one or more relations in the database, relations expose other table rows mapped to other domain objects, etc.

As shown in FIG. 23, oilfield data (e.g., seismic survey, well log, etc.) associated with oilfield entities (e.g., wellbore, reservoir, etc.) is stored in a first data repository (Step 2001) (e.g., a relational database, etc.) A first target metamodel (such as the metamodel described in FIG. 8 above) is then obtained (Step 2003). The first target metamodel includes structural description of data entities (e.g., database rows and columns, etc.) of the first data repository. A domain metamodel (such as the metamodel described in FIG. 8 above) and a first mapping specification (such as the metamodel described in FIG. 9 above) are also obtained (Step 2005). The domain metamodel includes structural description of a domain model for representing the oilfield entities in an application programming interface (e.g., an object oriented API). The first mapping specification associates the domain metamodel and the first target metamodel, such as the example described in FIG. 10 above. In some examples, the domain metamodel and the first mapping specification may be interleaved such as the example described in FIG. 11 above. In other examples, a portion of the domain model representing the oilfield entities is obtained from a reference metamodel (Step 2007) (e.g., the reference metamodel (2107) of FIG. 6). Finally, based on the domain metamodel, the first target metamodel, and the first mapping specification, the application programming interface is formed using a computer implemented method (Step 2009) (e.g., the code generator (2111) of FIG. 6). Oilfield data may then be accessed from the first data repository using the application programming interface (Step 2019). In (Step 2009), an interface layer of the application programming interface may be formed based on only the domain metamodel using the computer implemented method, while an implementation layer of the application programming interface may be formed based on the domain metamodel, the first target metamodel, and the first mapping specification using the computer implemented method.

Optionally, oilfield data (e.g., seismic survey, well log, etc.) associated with oilfield entities (e.g., wellbore, reservoir, etc.) may also be stored in a second data repository (Step 2011) (e.g., a relational database, etc.). A second target metamodel (such as the metamodel described in FIG. 8 above) may then be obtained (Step 2013). The second target metamodel includes structural description of data entities (e.g., database rows and columns, etc.) of the second data repository. A second mapping specification (such as the metamodel described in FIG. 9 above) may also be obtained (Step 2015). The second mapping specification associates the domain metamodel and the second target metamodel, such as the example described in FIG. 10 above. The application programming interface may then be further formed based on the second target metamodel and the second mapping specification using the same metamodel and the same computer implemented method as above (Step 2017). Oilfield data may then be accessed from the second data repository using the application programming interface (Step 2019).

An exemplary result of the method described above is illustrated in a drilling domain model application using Seabed database. Seabed is a relational database produced by Schlumberger Information Solutions for holding exploration and production information in support of a borehole operation. The exemplary domain model and mapping statistics for Seabed includes 100 domain objects, 91 Seabed entities, 618 simple properties, 144 relations, and 3,400 lines of indented XML. The exemplary generated code statistics include 250,000 lines of code (half comment and half non-comment) and 291 compile-time SQL queries. The exemplary results show that the code generation is a powerful mechanism for implementing mapping between data and domain models. The method described above creates code with consistent quality and completeness, allows data models to evolve without affecting domain models, and enables experimentation with alternative model mappings.

Furthermore, the steps of portions or all of the process may be repeated as desired. Repeated steps may be selectively performed until satisfactory results achieved. For example, steps may be repeated after adjustments are made. Adjustments to the oilfield operation may be made based on the oilfield data, the simulation results, the arrangement, and other factors. Various combinations may be tried and compared to determine the best outcome. The process may be repeated as desired.

It will be understood from the foregoing description that various modifications and changes may be made in the preferred and alternative embodiments of the present invention without departing from its true spirit. For example, the object API, data repository, and arrangement of the system may be altered to achieve the desired results. The data repository may be a relational database, a non-relational database, or other types of data store. In an example, the inputs to the code generator may be structured descriptions of physical models of oilfield entities and conceptual models of data entities in the form of a metamodel, in which case the code generator includes a metametamodel for interpreting the input metamodels. In another example, the inputs to the code generator may be in the form of a model, in which case the code generator includes a metamodel for interpreting the input models. The metametamodel may have different number of components than given in the example above and describe various different structures of the domain metamodel, the mapping specification, and the target relational metamodel. Although details are given in examples above regarding the domain metamodel, the mapping specification, and the target relational metamodel, each of them may consist of different number of components than described in the examples. Different structures of the domain metamodel may be used, the mapping specification may consist of various forms of hierarchical structures (e.g., varying number of nested levels and/or different recursive structures), and different structures of the target relational metamodel may also be used. For another example, the interleaving structure of the domain metamodel and the mapping specification may vary, the condition and structure of the mapping constraints may change, and the hierarchical structure of the code generator tasks may also be altered to achieve the desired results.

This description is intended for purposes of illustration only and should not be construed in a limiting sense. The scope of this invention should be determined only by the language of the claims that follow. The term "comprising" within the claims is intended to mean "including at least" such that the recited listing of elements in a claim are an open group. "A," "an" and other singular terms are intended to include the plural forms thereof unless specifically excluded.

What is claimed is:

1. A method for integrating oilfield data in a plurality of formats, the method comprising:
   storing the oilfield data associated with a plurality of oilfield entities in a first data repository;
   obtaining, using a computer, a first target metamodel comprising a first structural description of a first plurality of data entities of the first data repository, wherein the first structural description describes database rows and columns of the first data repository;
   obtaining, using the computer, a domain metamodel interleaved with a first mapping specification, the domain metamodel comprising a second structural description of a domain model, defining a plurality of domain objects within a hierarchy of an oilfield domain, for representing the plurality of oilfield entities in an application programming interface (API);
   associating, using the computer, the first plurality of data entities of the first target metamodel with the plurality of domain objects of the domain metamodel using the first mapping specification;
   forming, using the computer, the API based on the domain metamodel, the first target metamodel, and the first mapping specification;
   generating a domain model source code based on the domain metamodel, the first target metamodel, and the first mapping specification using an automatic code generator;
   compiling the domain model source code to implement the API;
   generating a plurality of domain object instances corresponding to the plurality of oilfield entities, wherein at least one of the plurality of domain object instances is instantiated from a domain object of the plurality of domain objects compiled from the domain model source code; and
   identifying an association between the plurality of oilfield entities with the first plurality of data entities based on the at least one of the plurality of domain object instances;
   receiving, by the API, a database operation for the domain metamodel, wherein the database operation comprises a plurality of elements that generate a result using data in the domain metamodel;
   determining that one element of the plurality of elements in the database operation for the domain metamodel is needed to generate the result in a form required by the database operation;
   executing the database operation after a status of the one element in the database operation is changed from optional to mandatory, and
   generating the result in the form required by the database operation.

2. The method of claim 1, further comprising:
   identifying an association between the plurality of oilfield entities and the first plurality of data entities based on the at least one of a plurality of hierarchical mapping units and a mapping constraint,
   wherein the first mapping specification comprises the plurality of hierarchical mapping units, and
   wherein at least one of the plurality of hierarchical mapping units is associated with the mapping constraint.

3. The method of claim 1, further comprising:
   generating one or more queries by analyzing the first mapping specification and the metamodel; and
   accessing the oilfield data from the first plurality of data entities using the one or more queries,
   wherein accessing the oilfield data comprises at least one selected from a group consisting of creating, reading, updating, and deleting oilfield data.

4. The method of claim 1, wherein at least a portion of the domain model is obtained from a reference metamodel.

5. The method of claim 1, further comprising:
   storing the oilfield data associated with the plurality of oilfield entities in a second data repository;
   obtaining a second target metamodel comprising a third structural description of a second plurality of data entities of the second data repository;
   obtaining a second mapping specification associating the second target metamodel with the domain metamodel; and
   further forming the API based on the second target metamodel and the second mapping specification.

6. The method of claim 1, wherein forming the API comprises:
   forming an interface layer of the API based on the domain metamodel; and
   forming an implementation layer of the API based on the first target metamodel, the domain metamodel, and the first mapping specification.

7. A method for integrating oilfield data in a plurality of formats, the method comprising:

storing the oilfield data associated with a plurality of oilfield entities in a data repository;

obtaining, using a computer, a first structural description of a plurality of data entities of the data repository, wherein the first structural description describes database rows and columns of the data repository;

obtaining a second structural description of a representation of the plurality of oilfield entities in an application programming interface (API), wherein at least a portion of the representation of the plurality of oilfield entities is obtained from a reference metamodel defining a plurality of domain objects within a hierarchy of an oilfield domain;

obtaining, using the computer, a mapping specification associating the first structural description with the second structural description;

forming, using the computer, the API based on the first structural description, the second structural description, and the mapping specification;

generating a domain model source code based on the first structural description, the second structural description, and the mapping specification using a automatic code generator;

compiling the domain model source code to implement the API;

generating a plurality of domain object instances corresponding to the plurality of oilfield entities, wherein at least one of the plurality of domain object instances is instantiated from a domain object of the plurality of domain objects compiled from the domain model source code;

identifying an association between the plurality of oilfield entities with the plurality of data entities based on the at least one of the plurality of domain object instances;

receiving, by the API, a database operation for the reference metamodel, wherein the database operation comprises a plurality of elements that generate a result using data in the reference metamodel;

determining that one element of the plurality of elements in the database operation for the reference metamodel is needed to generate the result in a form required by the database operation;

executing the database operation after a status of the one element in the database operation is changed from optional to mandatory, and generating the result in the form required by the database operation.

8. The method of claim 7, further comprising:

identifying an association between the plurality of oilfield entities and the plurality of data entities based on the at least one of a plurality of hierarchical mapping units and a mapping constraint, wherein the mapping specification comprises the plurality of hierarchical mapping units, and wherein at least one of the plurality of hierarchical mapping units is associated with the mapping constraint.

9. The method of claim 7, wherein the second structural description and the mapping specification are interleaved.

10. The method of claim 7, further comprising:

generating one or more commands by analyzing the mapping specification and the first structural description; and accessing the oilfield data from the plurality of data entities using the one or more commands, wherein accessing oilfield data comprises at least one selected from a group consisting of creating, reading, updating, and deleting oilfield data.

11. The method of claim 7, wherein forming the API comprises:

forming an interface layer of the API based on the second structural description; and forming an implementation layer of the API based on the first structural description, the second structural description, and the mapping specification.

12. A non-transitory computer storage readable medium embodying thereon instructions executable by a computer to perform a method for integrating oilfield data in a plurality of formats, the method comprising:

storing the oilfield data associated with a plurality of oilfield entities in a first data repository;

obtaining, using a computer, a first target metamodel comprising a first structural description of a first plurality of data entities of the first data repository, wherein the first structural description describes database rows and columns of the first data repository;

obtaining, using the computer, a domain metamodel interleaved with a first mapping specification, the domain metamodel comprising a second structural description of a domain model, defining a plurality of domain objects within a hierarchy of an oilfield domain, for representing the plurality of oilfield entities in an application programming interface (API);

associating, using the computer, the first plurality of data entities of the first target metamodel with the plurality of domain objects of the domain metamodel using the first mapping specification;

forming, using the computer, the API based on the domain metamodel, the first target metamodel, and the first mapping specification;

generating a domain model source code based on the domain metamodel, the first target metamodel, and the first mapping specification using a automatic code generator;

compiling the domain model source code to implement the API;

generating a plurality of domain object instances corresponding to the plurality of oilfield entities, wherein at least one of the plurality of domain object instances is instantiated from a domain object of the plurality of domain objects compiled from the domain model source code;

identifying an association between the plurality of oilfield entities with the first plurality of data entities based on the at least one of the plurality of domain object instances;

receiving, by the API, a database operation for the domain metamodel, wherein the database operation comprises a plurality of elements that generate a result using data in the domain metamodel;

determining that one element of the plurality of elements in the database operation for the domain metamodel is needed to generate the result in a form required by the database operation;

executing the database operation after a status of the one element in the database operation is changed from optional to mandatory, and generating the result in the form required by the database operation.

13. The computer readable medium of claim 12, wherein the method further comprises:
    identifying an association between the plurality of oilfield entities and the first plurality of data entities based on the at least one of a plurality of hierarchical mapping units and a mapping constraint,
    wherein the first mapping specification comprises the plurality of hierarchical mapping units, and
    wherein at least one of the plurality of hierarchical mapping units is associated with the mapping constraint.

14. The computer readable medium of claim 12, the method further comprising:
    generating one or more queries by analyzing the first mapping specification and the metamodel; and
    accessing the oilfield data from the first plurality of data entities using the one or more queries,
    wherein accessing the oilfield data comprises at least one selected from a group consisting of creating, reading, updating, and deleting the oilfield data.

15. The computer readable medium of claim 12, wherein at least a portion of the domain model is obtained from a reference metamodel.

16. The computer readable medium of claim 12, the method further comprising:
    storing the oilfield data associated with the plurality of oilfield entities in a second data repository;
    obtaining a second target metamodel comprising a third structural description of a second plurality of data entities of the second data repository;
    obtaining a second mapping specification associating the second target metamodel with the domain metamodel; and
    further forming the API based on the second target metamodel and the second mapping specification.

17. The computer readable medium of claim 12, wherein forming the API comprises:
    forming an interface layer of the API based on the domain metamodel; and
    forming an implementation layer of the API based on the first target metamodel, the domain metamodel, and the first mapping specification.

18. A non-transitory computer storage readable medium embodying thereon instructions executable by a computer to perform a method for integrating oilfield data in a plurality of formats, the method comprising:
    storing the oilfield data associated with a plurality of oilfield entities in a data repository;
    obtaining a first structural description of a plurality of data entities of the data repository, wherein the first structural description describes database rows and columns of the data repository;
    obtaining a second structural description of a representation of the plurality of oilfield entities in an application programming interface (API), wherein at least a portion of the representation of the plurality of oilfield entities is obtained from a reference metamodel defining a plurality of domain objects within a hierarchy of an oilfield domain;
    obtaining a mapping specification associating the first structural description with the second structural description;
    forming the API based on the first structural description, the second structural description, and the mapping specification;
    generating a domain model source code based on the domain metamodel, the first target metamodel, and the first mapping specification using a automatic code generator;
    compiling the domain model source code to implement the API;
    generating a plurality of domain object instances corresponding to the plurality of oilfield entities, wherein at least one of the plurality of domain object instances is instantiated from a domain object of the plurality of domain objects compiled from the domain model source code;
    identifying an association between the plurality of oilfield entities with the first plurality of data entities based on the at least one of the plurality of domain object instances;
    receiving, by the API, a database operation for the reference metamodel, wherein the database operation comprises a plurality of elements that generate a result using data in the reference metamodel;
    determining that one element of the plurality of elements in the database operation for the reference metamodel is needed to generate the result in a form required by the database operation;
    executing the database operation after a status of the one element in the database operation is changed from optional to mandatory, and
    generating the result in the form required by the database operation.

* * * * *